(12) United States Patent
Claxton et al.

(10) Patent No.: US 12,303,882 B2
(45) Date of Patent: May 20, 2025

(54) METHODS AND APPARATUS FOR INSTALLATION AND REMOVAL OF CATALYST CARRIERS

(71) Applicant: JOHNSON MATTHEY DAVY TECHNOLOGIES LIMITED, London (GB)

(72) Inventors: Henry Arthur Claxton, London (GB); Simon Graham, London (GB); Paul Holden, Royston (GB); Benjamin Geoffrey Mallam, Stockton-on-Tees (GB); Dean Graham Shaw, London (GB)

(73) Assignee: Johnson Matthey Davy Technologies Limited, London (GB)

( * ) Notice: Subject to any disclaimer, the term of this patent is extended or adjusted under 35 U.S.C. 154(b) by 303 days.

(21) Appl. No.: 18/040,228

(22) PCT Filed: Sep. 24, 2021

(86) PCT No.: PCT/GB2021/052493
§ 371 (c)(1),
(2) Date: Feb. 1, 2023

(87) PCT Pub. No.: WO2022/064214
PCT Pub. Date: Mar. 31, 2022

(65) Prior Publication Data
US 2023/0264160 A1    Aug. 24, 2023

(30) Foreign Application Priority Data
Sep. 25, 2020 (GB) ....................................... 2015180

(51) Int. Cl.
*B01J 8/06*    (2006.01)
*B01J 8/00*    (2006.01)

(52) U.S. Cl.
CPC .................. *B01J 8/06* (2013.01); *B01J 8/002* (2013.01); *B01J 2208/00752* (2013.01); *B01J 2208/00769* (2013.01); *B01J 2208/00814* (2013.01)

(58) Field of Classification Search
CPC ... B01J 8/06; B01J 8/002; B01J 8/0035; B01J 2208/00814; B01J 2208/00752; B01J 2208/00769; B01J 19/0053; B01J 4/007
See application file for complete search history.

(56) References Cited

U.S. PATENT DOCUMENTS 8,495,814 B1 * 7/2013 Whittenberger ......... B01J 19/32
                                                    294/93
9,643,150 B2    5/2017 Whittenberger et al.
(Continued)

FOREIGN PATENT DOCUMENTS

CL    202300711 A1    10/2023
CL    202300725 A1    10/2023
(Continued)

*Primary Examiner* — Lessanework Seifu
(74) *Attorney, Agent, or Firm* — BakerHostetler

(57) ABSTRACT

A method of installing catalyst carriers into a first selected reactor tube of a tubular reactor. The method comprising the steps of: i) providing an installation tool, the installation tool comprising: a) an installation frame; b) a movable ram mounted to the installation frame and configured for pushing one or more catalyst carriers into the first selected reactor tube; and c) one or more anchors for releasably attaching the installation frame to the tubular reactor; ii) attaching the installation tool to the tubular reactor by engaging the one or more anchors in one or more reactor tubes located alongside the first selected reactor tube so as to align the movable ram with the first selected reactor tube; and iii) actuating the movable ram to push the one or more catalyst carriers into the first selected reactor tube.

24 Claims, 22 Drawing Sheets

(56) References Cited

U.S. PATENT DOCUMENTS

| | | |
|---|---|---|
| 2005/0142049 A1 | 6/2005 | Amsden et al. |
| 2010/0063304 A1 | 3/2010 | Olbert et al. |
| 2016/0263542 A1 | 9/2016 | Brightling |
| 2023/0271151 A1 | 8/2023 | Clarkson et al. |
| 2023/0285917 A1 | 9/2023 | Baker et al. |
| 2023/0294056 A1 | 9/2023 | Clarkson et al. |
| 2023/0294058 A1 | 9/2023 | Clarkson et al. |

FOREIGN PATENT DOCUMENTS

| | | |
|---|---|---|
| CL | 202300744 A1 | 10/2023 |
| CL | 202300749 A1 | 10/2023 |
| DE | 3610457 C1 | 7/1987 |
| WO | 2011/048361 A1 | 4/2011 |
| WO | 2012/136971 A1 | 10/2012 |
| WO | 2013/001275 A2 | 1/2013 |
| WO | 2016/050520 A1 | 4/2016 |

\* cited by examiner

METHODS AND APPARATUS FOR INSTALLATION AND REMOVAL OF CATALYST CARRIERS

The present disclosure relates to methods and apparatus for installation and removal of catalyst carriers. In particular, the present disclosure relates to an installation tool, method and system for installing catalyst carriers into reactor tubes of a tubular reactor. Additionally, the present disclosure relates to methods and accessories for installing catalyst carriers into such reactor tubes and for emptying such reactor tubes which are initially at least partially filled with catalyst carriers. Additionally, the present disclosure relates to catalyst carriers and associated components for installation into such reactor tubes.

BACKGROUND

Conventional, so-called fixed-bed tubular, reactors comprise a reactor shell containing a plurality of tubes, which are usually cylindrical, and which are usually directly filled with catalyst particles. In use, a heat-transfer medium flows through the shell of the reactor outside these tubes and thereby adjusts the temperature of the catalyst in the tubes by heat exchange across the tube wall. Thus, where the reaction is an exothermic reaction, the heat-transfer medium will allow heat to be removed from the catalyst and where the reaction is an endothermic reaction, the heat-transfer medium will provide heat to the catalyst.

For some reactions, the heat effects of the reaction are moderate such that they are either not problematic or they can be readily managed. In some cases, the heat effects are sufficiently small that large-diameter tubes may be used. This has the benefit that there is a large volume of catalyst within the tube.

However, for more exothermic or endothermic reactions it is necessary that there is efficient heat transfer via the tube wall to the heat-transfer medium to enable the conditions within the reactor to be controlled in order to maintain a stable operating temperature to avoid detrimental effects occurring. Such effects, for exothermic reactions, may include side reactions taking place, damage to the catalyst such as by sintering of the catalytic active sites, and, in a worst case, thermal runaway. Detrimental effects for endothermic reactions may include quenching of the reaction.

To achieve the desired efficiency, the surface area of the tube wall per unit length has to be maximised. This has, in the past, been achieved by installing a greater number of smaller-diameter tubes. In some reactions, the size restriction means that the tubes are only of the order of about 15 to 40 mm internal diameter. However, the use of this multiplicity of tubes increases the cost and complexity of the reactor.

Thus, in an attempt to mitigate these problems an alternative approach has been developed, in particular for more exothermic or endothermic reactions, in which the catalyst is not directly packed into the reactor tubes but is instead contained in a plurality of catalyst carriers that are configured to sit within the reactor tube.

A first type of such a catalyst carrier is described in WO2011/048361. This arrangement seeks to optimise heat transfer at the tube wall such that larger tubes and larger volumes of smaller catalyst particles can be used, even for more exothermic or endothermic reactions. The catalyst carrier described in WO2011/048361 comprises an annular container for holding catalyst in use. The container has a perforated inner wall defining a tube, a perforated outer wall, a top surface closing the annular container and a bottom surface closing the annular container. The surface closing the bottom of the tube is formed by the inner wall of the annular container. A skirt extends upwards from the perforated outer wall of the annular container from a position at or near the bottom surface of the container to a position below the location of a seal. A seal is located at or near the top surface and extends from the container by a distance which extends beyond an outer surface of the skirt.

A second type of such a catalyst carrier is described in WO2012/136971. In this arrangement, the catalyst carrier comprises a container for holding a monolith catalyst in use, said container having a bottom surface closing the container and a skirt extending upwardly from the bottom surface of said container to a position below the location of a seal and spaced therefrom, said skirt being positioned such that there is a space between an outer surface of the monolith catalyst and the skirt; and a seal located at or near a top surface of the monolith catalyst and extending from the monolith catalyst by a distance which extends beyond an outer surface of the skirt.

A third type of such a catalyst carrier is described in WO2016/050520. In this arrangement, the catalyst carrier comprises a container for holding catalyst in use. The container has a bottom surface closing the container and a top surface. A carrier outer wall extends from the bottom surface to the top surface and a seal extends from the container by a distance which extends beyond the carrier outer wall. The carrier outer wall has apertures located below the seal.

The method, tool and system may be applied to any catalyst carrier suitable for insertion into a reactor tube in a tubular reactor.

In a tubular reactor there may be hundreds or possibly thousands of such catalyst carriers and therefore quick, efficient loading is important for users. Furthermore, for optimal performance of the catalyst carriers and the reactor, loading should ensure proper alignment of the catalyst carriers within the reactor tubes. In heat-exchange tubular reactors, it is also desirable to place the catalyst carriers in the heat-exchange zone so that uncontrolled heating or cooling is prevented. Moreover, it is desirable to establish apparatus and a method suitable for the discharge of catalyst carriers from reactor tubes, should this be required.

An object of the present disclosure is to provide apparatus and methods for the loading and unloading of catalyst carriers that address these matters.

SUMMARY OF THE DISCLOSURE

In a first aspect of the present disclosure there is provided a method of installing catalyst carriers into a first selected reactor tube of a tubular reactor, the method comprising the steps of:
  i) providing an installation tool, the installation tool comprising:
     a) an installation frame;
     b) a movable ram mounted to the installation frame and configured for pushing one or more catalyst carriers into the first selected reactor tube; and
     c) one or more anchors for releasably attaching the installation frame to the tubular reactor;
  ii) attaching the installation tool to the tubular reactor by engaging the one or more anchors in one or more reactor tubes located alongside the first selected reactor tube so as to align the movable ram with the first selected reactor tube; and iii) actuating the movable ram to push the one or more catalyst carriers into the first selected reactor tube.

In a second aspect the present disclosure provides an installation tool for installing catalyst carriers into a selected reactor tube of a tubular reactor, the installation tool comprising:
a) an installation frame;
b) a movable ram mounted to the installation frame and configured for pushing one or more catalyst carriers into the selected reactor tube; and
c) one or more anchors for engaging in one or more reactor tubes located alongside the selected reactor tube so as to releasably attach the installation frame to the tubular reactor.

In a third aspect the present disclosure provides an installation system for installing catalyst carriers into a reactor tube of a tubular reactor, the installation system comprising:
an installation tool as provided in the second aspect and that is configured for installation in a head space or a footer space of the tubular reactor;
a source of motive power locatable outside the tubular reactor and configured to move the movable ram of the installation tool; and
one or more hoses for supplying power from the source of motive power to the installation tool.

The method and system may be applied to any catalyst carrier which is to be inserted into a tubular reactor In some embodiments the source of motive power may alternatively be locatable inside the tubular reactor.

Advantageously, the installation tool may facilitate the loading of catalyst carriers into the reactor tubes of a tubular reactor. The installation tool may facilitate the correct alignment of the catalyst carriers during loading. In particular, the engagement of the one or more anchors may improve the alignment of the movable ram with the selected reactor tube. Beneficially the engagement of the one or more anchors in one or more reactor tubes alongside the first selected reactor tube may avoid the need for any part of the anchoring system to be within or extend into the first selected reactor tube. This may result in a simpler and faster loading method.

The one or more reactor tubes alongside the first selected reactor tube may be one or more reactor tubes that immediately neighbour the first selected reactor tube or may, alternatively, be one or more reactor tubes that are nearby the first selected reactor tube. In step ii) of the method of the first aspect, the installation tool may be attached such that the installation frame is located in a head space or footer space of the tubular reactor outside of the reactor tubes. The installation frame may be located above an upper tube sheet of the tubular reactor or below a lower tube sheet of the tubular reactor. In the case of a tubular reactor that is vertically orientated, it is generally preferred to load the catalyst carriers from the top of the tubular reactor. Consequently, in some preferred embodiments the installation tool may be located above the upper tube sheet in the head space of a vertically orientated tubular reactor.

Advantageously, the installation tool may be sized to fit within the head space or footer space of the tubular reactor. Step i) of the method of the first aspect may further comprise inserting the installation tool into a head space or footer space of the tubular reactor through an access opening of the tubular reactor.

Advantageously, the installation tool may be sized to accommodate moving of the installation frame into and out of the head space or footer space. This allows complete removal of the installation tool from the tubular reactor after loading has been completed meaning that no part need remain within the tubular reactor during operation, where it might obstruct gas flow into or out of the reactor tubes.

The movable ram may be a powered ram or a manually driven ram. The movable ram may be switchable from a powered mode in which the movable ram moves under power and a manual mode in which the movable ram is manually driven. The movable ram may be a hydraulic, pneumatic, or electro-mechanical ram.

Advantageously, the powered ram may increase the efficiency of operation by providing an increased and consistent insertion force for the catalyst carriers. However, in some circumstances it may be desirable to use a manually driven ram or to manually drive a ram that is normally powered.

In some embodiments the installation tool may be coupled to a source of motive power for moving the movable ram which source of motive power may be located outside of the tubular reactor. Locating the source of motive power outside of the tubular reactor is advantageous if space inside is limited. The source of motive power may comprise a hydraulic, pneumatic, or electrical source. For example, in some embodiments the source of motive power may be a hydraulic source that is coupled to the installation tool by one or more hydraulic hoses that may extend through an access opening in the tubular reactor. This arrangement may allow a larger hydraulic source to be utilised (which would not fit through the access opening) and also may allow the size of the installation tool to be reduced.

In some other embodiments the installation tool may comprise a source of motive power which is located inside the tubular reactor for moving the movable ram. In such cases the source of motive power may comprise a hydraulic, pneumatic, or electrical source. For example, in some embodiments the source of motive power may be an electrical source, for example an electric motor that is mounted directly to the installation frame.

In step iii) of the method of the first aspect an insertion set of one, two, three, or more catalyst carriers may be pushed into the first selected reactor tube by a single stroke of the movable ram. Step iii) of the method of the first aspect may be repeated one or more times to push one or more additional insertion sets into the first selected reactor tube.

The installation frame may define a loading station for receiving the one or more catalyst carriers. The loading station may be configured to hold an insertion set of one, two, three, or more catalyst carriers, and the movable ram may be configured for pushing the insertion set of catalyst carriers into the first selected reactor tube in a single stroke.

Advantageously, forming the catalyst carriers into insertion sets may increase the efficiency of operation by reducing the loading time of the installation tool, in particular in cases where the insertion sets are pre-formed. The insertion sets may also serve to maintain mutual alignment of the catalyst carriers in the set, reducing the chance of misalignment during insertion into the reactor tube.

Pushing an insertion set into a first end of the first selected reactor tube may cause one or more catalyst carriers to be pushed out of a second end of the first selected reactor tube. For example, when the installation tool is used on a reactor tube that is initially full of catalyst carriers, pushing a catalyst carrier into the first end may be used to discharge a catalyst carrier from the second end. In this way the catalyst carriers in a reactor tube may be replaced efficiently. All of the catalyst carriers initially in the reactor tube may be replaced in such a manner (for example, when a complete refresh of the catalyst in the reactor tube is desired). Alternatively, only a few of the catalyst carriers at the second end may be replaced in such a matter (for example, when a replacement of the initial cans in a reactor tube is desired due to e.g. poisoning of the catalyst). The second end may be the lower end of the tubular reactor or the upper end of the tubular reactor.

The method of the first aspect may further comprise detaching from the installation tool any of the one or more anchors that are not aligned with a reactor tube when the movable ram is aligned with the first selected reactor tube. To facilitate this, the one or more anchors may be detachable from the installation tool.

When loading some reactor tubes, especially those at or near the periphery of the tubular reactor, there may not always be a reactor tube located beneath each anchor of the installation tool. In such cases the anchor(s) may be detached from the installation frame. For example, an installation tool provided with four anchors may have one, two or three of the anchors detached. The anchor(s) remaining attached to the installation frame may be used for anchoring the installation tool.

The method of the first aspect may further comprise stabilising the installation tool using one or more stabilising feet that are coupled to the installation frame.

The stabilising feet may function to provide stability to the installation tool, for example to reduce or prevent rocking, tipping or tilting of the installation frame in use. Each stabilising foot may comprise, for example, a height-adjustable screw, foot, pad, plate, etc. Each stabilising foot may be configured to make contact, directly or indirectly, with the tube sheet between the reactor tubes, for example by having a small enough dimension to fit in between the reactor tubes. Alternatively, each stabilising foot may be configured to span across one or more reactor tubes, for example by having a foot plate.

The stabilising feet may be used in conjunction with the anchors. For example, each anchor may have an associated stabilising foot. The stabilising foot may be provided on the anchor or nearby the anchor. For example, where the installation tool has a generally quadrilateral basal shape, each corner may be provided with an anchor and a stabilising foot. The stabilising feet may be engaged against the tube sheet and/or the protruding faces of the reactor tubes by means of a foot plate prior to or after engaging the anchors in order to reduce or eliminate lifting or tipping of the installation frame during anchoring of the anchors.

The method of the first aspect may further comprise levelling the installation tool by adjusting one or more of the stabilising feet.

Advantageously, the stabilising feet may be used to ensure that the longitudinal (e.g. vertical) axis of the movable ram is aligned with the longitudinal axis of the reactor tube.

The one or more stabilising feet may be utilised in place of any of the one or more anchors that are detached from the installation tool. As noted above, at times one or more anchors may need to be removed as they will not align with a reactor tube. In such case the stabilising feet may be used to level and/or stabilise the installation tool. For example, where the installation tool has a generally quadrilateral basal shape, three corners may be anchored with anchors and one corner stabilised with a stabilising foot, or for example, two corners may be anchored with anchors and two corners stabilised with stabilising feet, or for example, one corner may be anchored with an anchor and three corners stabilised with stabilising feet.

The one or more anchors may comprise manually, hydraulically, pneumatically or electrically expandable anchors. In some other embodiments the one or more anchors may comprise sprung-loaded anchors, optionally sprung-loaded camming devices.

In step ii) of the method of the first aspect each of the one or more anchors may be expanded to grip an inner surface of the reactor tube. In some embodiments the one or more anchors may be expanded using a manual, hydraulic, pneumatic or electrical motive force. The same source of motive force may be used to actuate the anchors and to move the movable ram. For example, the same hydraulic source may be connected to both. Alternatively, the anchors may be actuated by a dedicated source of motive power that is provided on or adjacent to the installation frame. For example, a manually operated hydraulic pump may be used.

In some other embodiments the one or more anchors may be sprung-loaded and biased to expand to grip the inner surface of the reactor tube.

The installation frame may comprise a plurality of anchor mounts for coupling the anchors to the installation frame. The plurality of anchor mounts may surround an opening that accommodates passage of the one or more catalyst carriers into the selected reactor tube. The installation frame may comprise, for example, three anchor mounts arranged in a triangular arrangement around the opening, or four anchor mounts arranged in a quadrilateral arrangement around the opening.

Where the installation tool is located in the footer space for mounting against the lower tube sheet, the installation tool may be provided with one or more braces. The brace(s) may span between the installation frame and an abutment of the tubular reactor. For example, the brace(s) may extend from the platform of the installation frame into contact with, for example, a floor of the tubular reactor and act to support and/or push the installation frame up against the lower tube sheet. The brace(s) may comprise one or more extendable legs coupled to the platform. The extendable legs may be extendable, for example, manually, pneumatically or hydraulically.

The movable ram may comprise an aligning device that aligns the one or more catalyst carriers with the first selected reactor tube. The aligning device may comprise a first engaging part that engages a second engaging part of the one or more catalyst carriers. The first engaging part may be resilient and/or sprung-loaded. Preferably the aligning device comprises a centring device that aligns the one or more catalyst carriers on a centre axis of the first selected reactor tube.

Advantageously, the aligning device may facilitate efficient operation of the installation tool by helping to align the catalyst carriers during insertion. For example, when the catalyst carriers are manually loaded into the installation tool they may be orientated slightly off the vertical. The aligning device may function to capture and bring the catalyst carrier into vertical alignment at the start of the insertion stroke. In this way loading of the installation tool can be carried out more quickly as the operator does not need to check exact alignment of the catalyst carriers during each loading operation.

The movable ram may be configured for pushing one or more catalyst carriers into a second selected reactor tube and optionally one or more further selected reactor tubes simultaneously to pushing the one or more catalyst carriers into the first selected reactor tube. Actuating the movable ram may simultaneously push one or more catalyst carriers into the first selected reactor tube and one or more catalyst carriers into the second selected reactor tube and optionally one or more catalyst carriers into the one or more further selected reactor tubes. To facilitate this the movable ram may comprise a first ram portion for pushing the one or more catalyst carriers into the first selected reactor tube and a second ram portion for simultaneously pushing one or more catalyst carriers into a second selected reactor tube; and optionally one or more further ram portions for simultaneously pushing one or more catalyst carriers into the one or more further selected reactor tubes.

Advantageously, loading of the catalyst carriers may be made faster by using the installation tool to load two, three or more reactor tubes simultaneously.

The method of the first aspect may further comprise the steps of:
iv) disengaging the one or more anchors from the one or more reactor tubes located alongside the first selected reactor tube;
v) moving the installation tool and re-attaching the installation tool to the tubular reactor by engaging the one or more anchors in one or more reactor tubes located alongside a second selected reactor tube so as to align the movable ram with the second selected reactor tube; and
vi) actuating the movable ram to push one or more catalyst carriers into the second selected reactor tube.

The stabilising feet may be repositioned and/or adjusted as required for the loading of the second selected reactor tube.

The installation system of the third aspect may further comprise:
a second installation tool as provided in the second aspect and that is configured for installation in the head space or the footer space of the same tubular reactor; and
one or more hoses for supplying power from the source of motive power to the second installation tool.

In some embodiments two, three or more installation tools may be used simultaneously.

In a fourth aspect the present disclosure provides a method of installing catalyst carriers into a reactor tube of a tubular reactor, the tubular reactor being of a type comprising a plurality of reactor tubes that extend between a first tube sheet and a second tube sheet, with a heat-exchange zone being provided between the first tube sheet and the second tube sheet;
the method comprising:
i) providing a plurality of catalyst carriers that contain a catalyst;
ii) providing a support unit; and
iii) installing the support unit and the plurality of catalyst carriers into the reactor tube such that the support unit is aligned with the second tube sheet and the plurality of catalyst carriers are arranged in a stacked arrangement abutting the support unit such that all of the catalyst within the reactor tube is located within the heat-exchange zone.

In a fifth aspect the present disclosure provides a support unit for installation into a reactor tube of a tubular reactor, the tubular reactor being of a type comprising a plurality of reactor tubes that extend between a first tube sheet and a second tube sheet, with a heat-exchange zone being provided between the first tube sheet and the second tube sheet;
the support unit comprising an elongate body having a first end configured to engage against a support surface of the tubular reactor when the support unit is installed in the reactor tube and a second end configured to engage against an end of a stack of catalyst carriers abutting the support unit;
wherein the length of the elongate body is configured to support the stack of catalyst carriers such that all of the catalyst within the reactor tube is located within the heat-exchange zone.

Advantageously, the support unit may function to prevent a catalyst carrier containing catalyst being located at the level of the second tube sheet. Instead, all of the catalyst carriers containing catalyst may be located within the heat-exchange zone. This may result in a more optimised performance of the tubular reactor, since heat exchange with all of the catalyst carriers is facilitated.

Advantageously, the support unit may also function to provide physical support to the catalyst carriers and maintain the catalyst carriers in a desired arrangement within the reactor tube.

The support unit may comprise an inner channel for transfer of liquids and gases through the support unit. Advantageously, the inner channel may ensure that the presence of the support unit does not interfere with liquid and gas flow during operation of the reactor tube.

The support unit may comprise or consist of a tubular element.

In some embodiments the first tube sheet may be an upper tube sheet and the second tube sheet may be a lower tube sheet and the support unit may be installed so as to be located at the level of the lower tube sheet and the plurality of catalyst carriers may be arranged in the stacked arrangement on top of the support unit such that all of the catalyst within the reactor tube is located above the level of the lower tube sheet within the heat-exchange zone. After insertion the support unit may be located at the bottom of the stacked arrangement, optionally engaged against a support surface of the tubular reactor. The support surface may also be a platform, temporary or otherwise, installed in the tubular reactor.

In some other embodiments the first tube sheet may be a first end tube sheet and the second tube sheet may be a second end tube sheet and the support unit may be installed so as to be aligned with the second end tube sheet and the plurality of catalyst carriers may be arranged in the stacked arrangement to one side of the support unit such that all of the catalyst within the reactor tube is located to one side of the second end tube sheet within the heat-exchange zone.

The support unit may be pushed first into the reactor tube followed by the plurality of catalyst carriers. This may in particular be where the loading is from the top of the reactor tube. Alternatively, the support unit may be pushed last into the reactor tube after the plurality of catalyst carriers. This may in particular be where the loading is from the bottom of the reactor tube.

Advantageously, the support unit may be configured to be pushed into the reactor tube using the installation tool and/or installation system of the second and third aspects described above. Beneficially, efficient operation is promoted by provision of an installation tool that is configured to carry out multiple functions.

The support unit may be attached to one or more catalyst carriers to form an insertion set. The attachment may be a releasable or permanent attachment. The insertion set may be pushed into the reactor tube in a single operation with the support unit foremost.

The support unit may be attached to the one or more catalyst carriers to form the insertion set using co-operating formations.

The method of the fourth aspect may further comprise providing a spacer element for aligning the support unit with an inner surface of the reactor tube. The spacer element may optionally also function as a seal between the support unit and an inner surface of the reactor tube.

The method of the fourth aspect may further comprise forming a seal between the support unit and an inner surface of the reactor tube such that liquids and gases passing along the reactor tube may preferentially be directed to flow through an interior of the support unit. To facilitate this the support unit may further comprise a seal for sealing between the support unit and an inner surface of the reactor tube; and optionally wherein the seal is or comprises a spacer element for aligning the support unit with an inner surface of the reactor tube. Because the seal function is secondary to the alignment function, some bypass of the seal may be tolerated.

The method of the fourth aspect may further comprise selecting the materials and any contents of the support unit to be non-reactive with respect to the intended process conditions of the tubular reactor.

In a sixth aspect the present disclosure provides a method of installing catalyst carriers into a reactor tube of a tubular reactor, the tubular reactor being of a type comprising a plurality of reactor tubes that extend between a first tube sheet and a second tube sheet, with a heat-exchange zone being provided between the first tube sheet and the second tube sheet;

the method comprising:
  i) providing a plurality of catalyst carriers that contain a catalyst;
  ii) providing a spacer unit;
  iii) installing the plurality of catalyst carriers into the reactor tube followed by the spacer unit such that the spacer unit is aligned with the first tube sheet and the plurality of catalyst carriers are arranged in a stacked arrangement abutting the spacer unit such that all of the catalyst within the reactor tube is located within the heat-exchange zone.

In a seventh aspect the present disclosure provides a spacer unit for installation into a reactor tube of a tubular reactor, the tubular reactor being of a type comprising a plurality of reactor tubes that extend between a first tube sheet and a second tube sheet, with a heat exchange zone being provided between the first tube sheet and the second tube sheet;

the spacer unit comprising an elongate body having a first end configured to engage against an end of a stack of catalyst carriers and a second end configured to engage against an installation tool;
  wherein the length of the elongate body is configured to enable displacement of the stack of catalyst carriers sufficiently into the reactor tube such that all of the catalyst within the reactor tube is located within the heat-exchange zone.

Advantageously, the spacer unit may function to prevent a catalyst carrier containing catalyst being located at the level of the first tube sheet. Instead, all of the catalyst carriers containing catalyst may be located within the heat-exchange zone. This may result in a more optimised performance of the tubular reactor, since heat exchange with all of the catalyst carriers is facilitated.

The spacer unit may comprise an inner channel for transfer of liquids and gases through the spacer unit. Advantageously, the inner channel may ensure that the presence of the spacer unit does not interfere with liquid and gas flow during operation of the reactor tube.

The spacer unit may comprise or consist of a tubular element.

In some embodiments the first tube sheet may be an upper tube sheet and the second tube sheet may be a lower tube sheet and the spacer unit may be installed so as to be located at the level of the upper tube sheet and the plurality of catalyst carriers may be arranged in the stacked arrangement beneath the spacer unit such that all of the catalyst within the reactor tube is located beneath the level of the upper tube sheet within the heat-exchange zone. Installing the spacer unit may comprise pushing the spacer unit into the reactor tube to downwardly displace the plurality of catalyst carriers within the reactor tube such that the catalyst in an uppermost catalyst carrier is located beneath the level of the upper tube sheet. These embodiments are particularly suitable where the reactor is aligned vertically.

In some other embodiments the first tube sheet may be a first end tube sheet and the second tube sheet may be a second end tube sheet and the spacer unit may be installed so as to be aligned with the first end tube sheet and the plurality of catalyst carriers may be arranged in the stacked arrangement to one side of the spacer unit such that all of the catalyst within the reactor tube is located to one side of the first end tube sheet within the heat-exchange zone. These embodiments are particularly suitable where the reactor is aligned horizontally.

The method of the sixth aspect may further comprise removing the spacer unit from the reactor tube once the catalyst carrier installation is complete to leave an endmost catalyst carrier of the stacked arrangement positioned at a point such that the catalyst in the endmost catalyst carrier is located within the heat-exchange zone.

The method of the sixth aspect may further comprise inserting a secondary spacer unit against the endmost catalyst carrier. The secondary spacer unit may comprise a spacing portion that extends to outside of the reactor tube and a supporting portion on the end outside of the reactor tube. The secondary spacer unit may thus span between the endmost catalyst carrier and a support surface of the tubular reactor. The support surface may be a support grid that extends across an open end of the reactor tube.

The spacer unit may not be attached to the catalyst carriers and may be free to move within the reactor tube to facilitate its removal. Alternatively, the spacer unit may be attached to one or more of the catalyst carriers to form an insertion set. The attachment may be a releasable or permanent attachment. The insertion set may be pushed into the reactor tube in a single operation with the spacer unit aftmost.

Where the spacer unit is attached to the one or more catalyst carriers to form the insertion set, this may be provided using co-operating formations on the spacer unit and on the one or more catalyst carriers. To facilitate this, the spacer unit may comprise one or more co-operating formations provided on the spacer unit for engaging one or more co-operating formations on the one or more catalyst carriers.

The materials and any contents of the spacer unit may be non-reactive with respect to the intended process conditions of the tubular reactor.

The elongate body may comprise an abutment face for engaging against a datum face of the reactor tube, optionally against an end face of the reactor tube. The abutment face may comprise an outwardly extending flange having an outer diameter configured to be greater than an internal diameter of the reactor tube.

The second end of the elongate body may comprise a socket for engaging with a movable ram of an installation tool.

The first end of the elongate body may comprise a skirt for engaging with an end of a catalyst carrier. An annular skirt for engaging with an annular rim or annular recess may be provided at an end of the catalyst carrier.

A position of an endmost catalyst carrier of the stacked arrangement in the reactor tube may be controlled by fixing a length of the spacer unit between a first end face of the spacer unit and an abutment face of the spacer unit, and inserting the spacer unit into the reactor tube until the abutment face is engaged against a datum face of the reactor tube, optionally against an end face of the reactor tube.

The plurality of catalyst carriers and the spacer unit may be configured to be installed into the reactor tube using one and the same installation tool. The installation tool may use a movable ram to push the plurality of catalyst carriers and the spacer unit into the reactor tube.

Advantageously, the spacer unit may be configured to be pushed into the reactor tube using the installation tool and/or installation system of the second and third aspects described above. Beneficially, efficient operation is promoted by provision of an installation tool that is configured to carry out multiple functions.

In an eighth aspect the present disclosure provides a method of at least partially emptying a reactor tube of a tubular reactor which is initially at least partially filled with catalyst carriers, the catalyst carriers each being of a type containing a catalyst and having a seal that engages against an inner surface of the reactor tube;

the method comprising:
i) providing a plurality of ejector units;
ii) installing a first ejection set of one or more of the ejector units into a first end of the reactor tube to contact and displace an endmost catalyst carrier within the reactor tube to thereby push the catalyst carriers within the reactor tube towards a second end of the reactor tube;
iii) installing a subsequent ejection set of one or more of the ejector units into the first end of the reactor tube to contact and displace an ejection set of the one or more ejector units already within the reactor tube to thereby push the catalyst carriers further towards the second end of the reactor tube;
iv) repeating step iii) one or more times until three or more of the catalyst carriers are displaced to the second end of the reactor tube and discharged out of the second end of the reactor tube.

In a ninth aspect the present disclosure provides an ejector unit for removing catalyst carriers from a reactor tube of a tubular reactor, the ejector unit comprising an elongate body having a first end configured for engaging against a catalyst carrier and a second end configured for engaging against an installation tool;

wherein a maximum diameter of the elongate body is configured to be less than an inner diameter of the reactor tube so that the ejector unit can slide freely within the reactor tube.

Advantageously, the ejector units may function to facilitate efficient full- or partial-emptying of a reactor tube and also efficient exchange of the catalyst carriers within a reactor tube. In particular, once the catalyst carriers have been discharged from the reactor tube the ejector units may be easily removed from the reactor tube. In particular, where the reactor tube is orientated vertically the ejector units may self-discharge from the lower end of the reactor tube under the effect of gravity.

When it is desired to fully empty a reactor tube, for example for maintenance or inspection of the reactor tube, ejection sets of one or more ejector units may be installed into the first end of the reactor tube sequentially until all of the catalyst carriers have been discharged out of the second end. The point when the last catalyst carrier has been discharged will be apparent to the operator due to the appearance of the first installed ejection set at the second end.

When it is desired to partially empty a reactor tube, for example to replace one or more catalyst carriers that have been poisoned, sufficient ejection sets of one or more ejector units may be installed into the first end of the reactor tube sequentially until the required number of catalyst carriers have been discharged out of the second end. For example, an ejection set of three ejection units may be installed in a lower end of the reactor tube to discharge three catalyst carriers out of the upper end of the reactor tube. Subsequently the ejection set may self-discharge out of the lower end of the reactor tube under the effect of gravity.

When it is desired to exchange the catalyst carriers in the reactor tube with new catalyst carriers this may be achieved without first emptying the reactor tube. Instead new catalyst carriers may be installed into the first end of the reactor tube which thereby causes old catalyst carriers to be discharged out of the second end. Beneficially, an ejection sets of one or more ejector units may be installed in a first step into the first end of the reactor tube followed subsequently by the new catalyst carriers. The point when the last old catalyst carrier has been discharged from the reactor tube will be apparent to the operator due to the appearance of the ejection set at the second end. This avoids the disadvantage of potentially leaving any old catalyst carriers in the reactor tube due to miscounting.

Ejector units may comprise a rigid portion for pushing the catalyst carriers through the tubes. The rigid portion may be of any shape that functions to push the catalyst carrier, desirably with uniform application of force. Suitably, the ejector unit may comprise or consist of a tubular element.

In some embodiments the first end may be a top end of the reactor tube and the second end may be a bottom end of the reactor tube.

The ejector units may be configured to have a maximum diameter that is less than an inner diameter of the reactor tube so as to be freely slidable therein.

The method of the eighth aspect may further comprise the step of:
v) after discharging the last of the catalyst carriers out of the second end of the reactor tube, allowing the plurality of ejector units to slide out of the second end of the reactor tube under the action of gravity.

The ejector unit may be any length capable of installation within the tube. The length may correspond to one, two, three or more catalyst carriers where the installation apparatus and/or space within the reactor so permits. If desired an ejection set comprising two or more ejector units may be used.

A first ejection set and/or a subsequent ejection set may comprise two or more ejector units that are attached to each other. The attachment may be a releasable or permanent attachment. To facilitate this, the ejector unit may further comprise one or more co-operating formations provided on or towards the first end of the ejector unit for engaging one or more co-operating formations on or towards the second end of another ejector unit.

The first end of the ejector unit may also be configured for engaging against an end of another ejector unit.

The second end of the elongate body may comprise a socket for engaging with a movable ram of an installation tool.

The first end of the elongate body may comprise a skirt for engaging with an end of a catalyst carrier and/or an end of another ejection unit.

The first ejection set and the subsequent ejection set may each be pushed into the reactor tube with a single stroke of an installation tool.

The catalyst carriers and the plurality of ejector units may be configured to be inserted into the reactor tube using one and the same installation tool. The installation tool may use a movable ram to push the catalyst carriers and the plurality of ejector units into the reactor tube.

Advantageously, the ejector unit may be configured to be pushed into the reactor tube using the installation tool and/or installation system of the second and third aspects described above. Beneficially, efficient operation is promoted by provision of an installation tool that is configured to carry out multiple functions.

In a tenth aspect the present disclosure provides a method of installing catalyst carriers into a reactor tube of a tubular reactor, the method comprising the steps of:
i) providing a plurality of catalyst carriers;
ii) engaging two or more of the plurality of catalyst carriers together to form an insertion set;
iii) loading the insertion set in an installation tool; and
iii) using the installation tool to push the insertion set into the reactor tube.

In an eleventh aspect the present disclosure provides a plurality of catalyst carriers for insertion into a reactor tube of a tubular reactor, each of the plurality of catalyst carriers comprising a container for holding catalyst in use which extends between an upper end and a lower end of the catalyst carrier;
each catalyst carrier comprising one or more upper co-operating formations provided on or towards the upper end of the container and one or more lower co-operating formations provided on or towards the lower end of the container;
the one or more upper co-operating formations being configured for engagement with the one or more lower co-operating formations;
wherein two or more of the plurality of the catalyst carriers can be attached together in a stacked arrangement with adjacent catalyst carriers being engaged together by engagement of the one or more lower co-operating formations and the one or more upper co-operating formations.

Advantageously, forming the catalyst carriers into insertion sets by engaging two or more of the plurality of catalyst carriers together may facilitate efficient operation by helping to align the catalyst carriers during insertion. For example, the co-operating formations may promote the correct mutual alignment of the catalyst carriers within the insertion set. In this way, two, three or more catalyst carriers may be efficiently and resiliently coupled together to have a common longitudinal axis.

In addition, the use of the co-operating formation to produce insertion sets may improve efficiency of operation by easing the manual handling of the catalyst carriers. In particular, two, three or more catalyst carriers may be loaded into the installation tool in one operation; for example, manually with one hand.

The installation tool may be the installation tool of the second aspect described above.

The insertion set may comprise at least two, optionally at least three, optionally more than three, catalyst carriers.

The insertion set may comprise a stacked arrangement of catalyst carriers with adjacent catalyst carriers being engaged together using co-operating formations provided on or towards an upper end and on or towards a lower end of each catalyst carrier. The engagement may be a releasable or permanent engagement.

The one or more upper co-operating formations and the one or more lower co-operating formations may be configured to be engaged and disengaged by relative rotational movement of the adjacent catalyst carriers. The adjacent catalyst carriers may be rotationally locked together. The one or more upper co-operating formations and the one or more lower co-operating formations may form one or more bayonet fittings.

A second insertion set may be provided that may be formed by engaging a further two or more of the plurality of catalyst carriers. The engagement may be a releasable or permanent engagement. The installation tool may be used to push the second insertion set into the reactor tube after the first insertion set to thereby push the first insertion set further down the reactor tube.

Each container may comprise a bottom surface at the lower end, a top surface at the upper end, and a carrier outer wall extending between the bottom surface to the top surface.

Each container may further comprise a seal extending beyond the carrier outer wall; and optionally the carrier outer wall may comprise apertures located below the seal.

The one or more upper co-operating formations may be provided above the seal.

Each container may further comprise an annular chamber for holding catalyst in use, said annular chamber having a perforated inner chamber wall defining an inner channel, a perforated outer chamber wall, a top surface closing the annular chamber and a bottom surface closing the annular chamber.

The present methods, tools, systems and associated parts may usefully be used for a wide range of processes. Examples of suitable uses include processes and reactors for exothermic reactions such as reactions for the production of methanol, reactions for the production of ammonia, methanation reactions, shift reactions, oxidation reactions such as the formation of maleic anhydride and ethylene oxide reactions and the like. A particularly preferred use is in processes and reactors for performing the Fischer-Tropsch reaction.

Endothermic reactions such as pre-reforming, dehydrogenation and the like may also be carried out in conjunction with the present methods, tools, systems and associated parts.

The catalyst carriers of the present disclosure may be filled or partially filled with or contain any catalyst suitable for the intended reaction. For example, a Fischer-Tropsch catalyst may be used for the Fischer-Tropsch reaction. Cobalt-containing Fischer-Tropsch catalysts are preferred. The catalyst may be provided as catalyst particles or a catalyst monolith. The catalyst may be provided as a single bed of catalyst or multiple beds of catalyst. The catalyst carrier may be configured to promote axial and/or radial flow through the catalyst. In some embodiments the catalyst carrier may be configured to preferentially promote radial flow through the catalyst.

The catalyst carrier of the present disclosure may be formed of any suitable material. Such material will generally be selected to withstand the operating conditions of the tubular reactor. The catalyst carrier may be fabricated from carbon steel, aluminium, stainless steel, other alloys or any material able to withstand the reaction conditions.

The catalyst carrier of the present disclosure may advantageously allow catalyst to be used in medium to highly exothermic or endothermic reactions. The catalyst carrier may allow the use of large reactor tubes leading to large weight and cost reductions for a reactor of a given capacity.

BRIEF DESCRIPTION OF THE DRAWINGS

Embodiments of the present disclosure will now be described, by way of example only, with reference to the accompanying drawings, in which.

DETAILED DESCRIPTION

Figure 1:
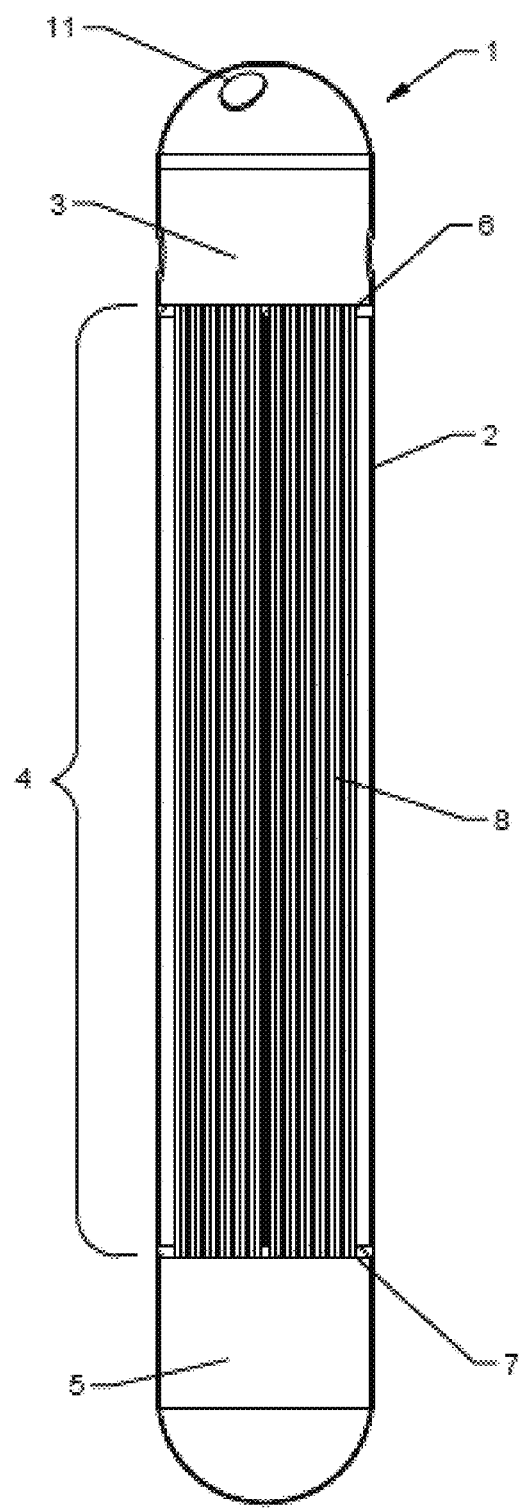
FIG. 1 is a schematic view of a tubular reactor.
Figure 2:
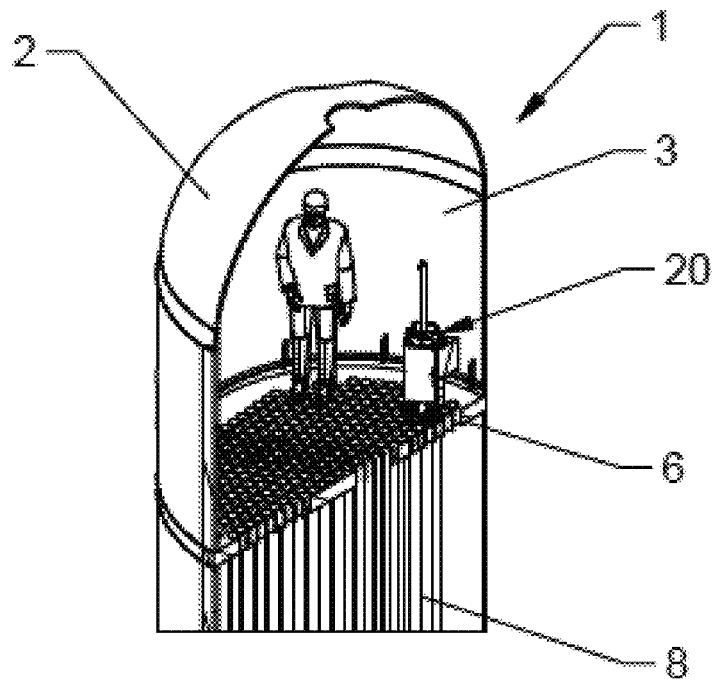
FIG. 2 is a schematic perspective view of a portion of the interior of the tubular reactor of FIG. 1.

In the following, aspects and embodiments of the present disclosure will be described, by way of example only, with reference to a vertically orientated tubular reactor having a plurality of vertical reactor tubes extending between an upper tube sheet and a lower tube sheet. However, it will be understood that the present disclosure may also be applied to other configurations of tubular reactor that may adopt other orientations.

Additionally, in this specification any reference to orientation; for example, terms such as top, bottom, upper, lower, above, below and the like have; is used with regard to the orientation of the parts as illustrated in the drawings being referenced but is not to be seen as restrictive on the potential orientation of such parts in actual use. For example, a part described as being orientated vertically may also be orientated horizontally.

FIG. 1 shows a typical layout of a tubular reactor 1 of the present disclosure. The tubular reactor 1 comprises a housing 2. The interior of the housing may be divided into a head space 3, a heat-exchange zone 4 and a footer space 5 by two tube sheets—an upper tube sheet 6 and a lower tube sheet 7. The upper tube sheet 6 separates the head space 3 from the heat-exchange zone 4. The lower tube sheet 7 separate the footer space 5 from the heat-exchange zone 4.

A plurality of reactor tubes 8 extend between the upper tube sheet 6 and the lower tube sheet 7. A large number of reactor tubes 8 may be provided, for example between 20 and 5000 reactor tubes 8 may be present. Each reactor tube 8 may have, for example, an internal diameter of between 20 and 150 mm. In some embodiments the internal diameter may be about 85 mm.

Each reactor tube 8 is intended to be filled or substantially filled with a stacked arrangement of catalyst carriers 10 (not shown). An example of a suitable catalyst carrier is shown in FIGS. 9 to 13 and will be described further below. In particular, it is typically desired that the catalyst carriers 10 cover all or substantially all of the length of the reactor tube 8 between the upper tube sheet 6 and the lower tube sheet 7, i.e. that they cover all or substantially all of the length of the heat-exchange zone 4.

Typically, the catalyst carriers 10 are loaded into the upper ends of the reactor tubes 8 when filling the reactor tubes 8 and discharged from the lower ends of the reactor tubes 8 when emptying the reactor tubes 8. However, it will be understood that the reverse may take place. This may in particular be desirable where catalyst carriers in an upper end of a reactor tube 8 require replacement. In such a case the catalyst carriers 10 at the upper end may be discharged out of the upper end of the reactor tube 8 by, for example, loading one or more catalyst carriers 10 into the lower end of the reactor tube 8 to push the catalyst carriers 10 at the upper end out of the reactor tube 8.

The head space 3 may provide access to an upper end of the reactor tubes 8 to allow loading of the catalyst carriers 10 into the reactor tubes 8. An access opening 11 may be provided in the housing 2 to allow access to the head space 3. The access opening 11 may, for example, be a manhole or other access panel that can be selectively opened and closed.

The footer space 5 may provide access to the lower end of the reactor tubes 8 to allow unloading of the catalyst carriers 10 from the reactor tubes 8.

According to one aspect of the present disclosure an installation tool 20 is provided that can be used for installing the catalyst carriers 10 into the reactor tubes 8.

The installation tool 20, as shown in FIGS. 2 to 7, generally comprises at least an installation frame 21, a movable ram 22 mounted to the installation frame 21, and one or more anchors 23 for anchoring the installation frame 21 to one of the tube sheets of the tubular reactor 1.

Figure 5:
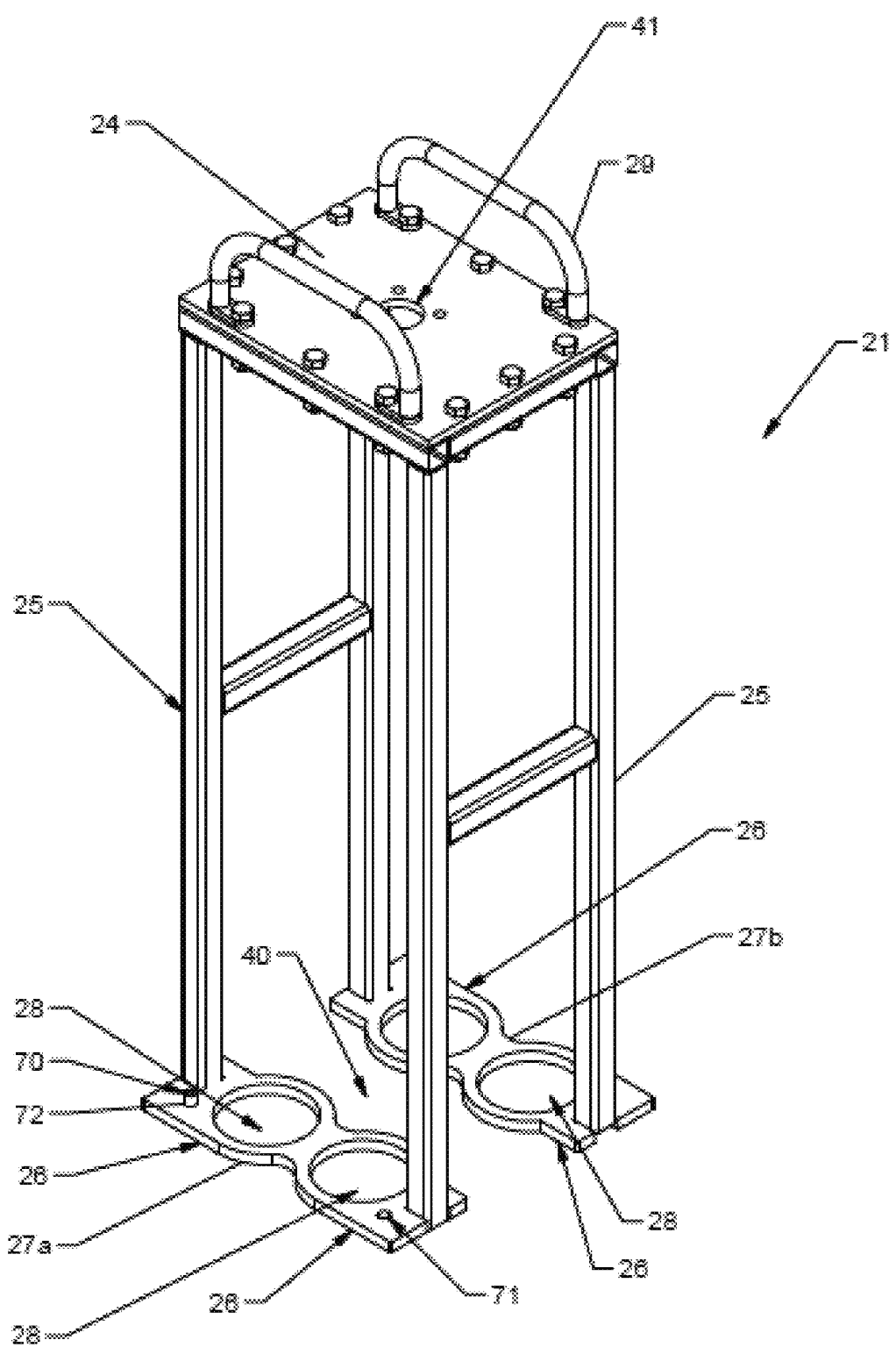
FIG. 5 is a perspective view of an installation frame of the installation tool of FIG. 4.

As shown in FIG. 5, the installation frame 21 may comprise a platform 24 from which extend four support legs 25, each terminating in a foot 26. The feet 26 may be separate. However, in the illustrated example a first pair of feet 26 are joined together to form a first support plate 27a and a second pair of feet 26 are joined together to form a second support plate 27b.

The installation frame 21 may comprise a plurality of anchor mounts for coupling anchors 23 to the installation frame 21. Each anchor mount may be provided in one of the feet 26. The anchor mount may comprise an aperture 28 in the foot 26 sized and shaped to receive the anchor 23.

The plurality of anchor mounts, for example the apertures 28, may surround an opening 40 that accommodates passage of the catalyst carriers 10 into the reactor tubes 8, as will be described further below. The opening 40 may be located centrally between the anchor mounts.

The installation frame 21 may comprise, for example, three anchor mounts arranged in a triangular arrangement around the opening 40, or four anchor mounts arranged in a quadrilateral arrangement around the opening 40, as shown in the illustrated example of FIG. 5.

One or more handles 29, for example a pair of handles 29, may be provided for lifting the installation tool 20. The handles 29 may be mounted to the platform 24.

The movable ram 22 may be configured for pushing one or more of the catalyst carriers 10 into the reactor tubes 8.

The movable ram 22 may be a powered ram or a manually driven ram. The movable ram 22 may be switchable from a powered mode in which the movable ram 22 moves under power and a manual mode in which the movable ram 22 is manually driven. The movable ram 22 may be a hydraulic, pneumatic, or electro-mechanical ram.

The movable ram 22 may be mounted to the platform 24 of the installation frame 21 and at least a part thereof may project through a ram aperture 41 provided in the platform 24, as shown in FIG. 5. A longitudinal axis of the movable ram 22 may be aligned with the opening 40.

The movable ram 22 may comprise an aligning device 50 which aligns the catalyst carrier 10 with a selected reactor tube 8a in use. As shown in more detail in FIGS. 7 and 8, the aligning device 50 may comprise a first engaging part that engages a second engaging part of a catalyst carrier 10. The aligning device 50 may be coupled to an end of the movable ram 22 and may be located beneath the platform 24. In particular, the aligning device 50 may be coupled to a movable piston of the movable ram 22 and may move therewith.

The first engaging part may be resilient and/or sprung-loaded. The first engaging part may comprise a pin 51 that may be slidably mounted within a bore 52 of a collar 53. A spring 54 may be provided to bias the pin 51 into an extended configuration. The pin 51 may be centrally located within the collar 53. A distal end of the pin 51 may be provided with a head 55 that may be shaped to engage with a portion of the catalyst carrier 10. The head 55 may have a conical face 56.

The collar 53 may comprise a rim 57 that faces downwards. A void space 58 may be provided between the rim 57 and the pin 51.

Figure 3:
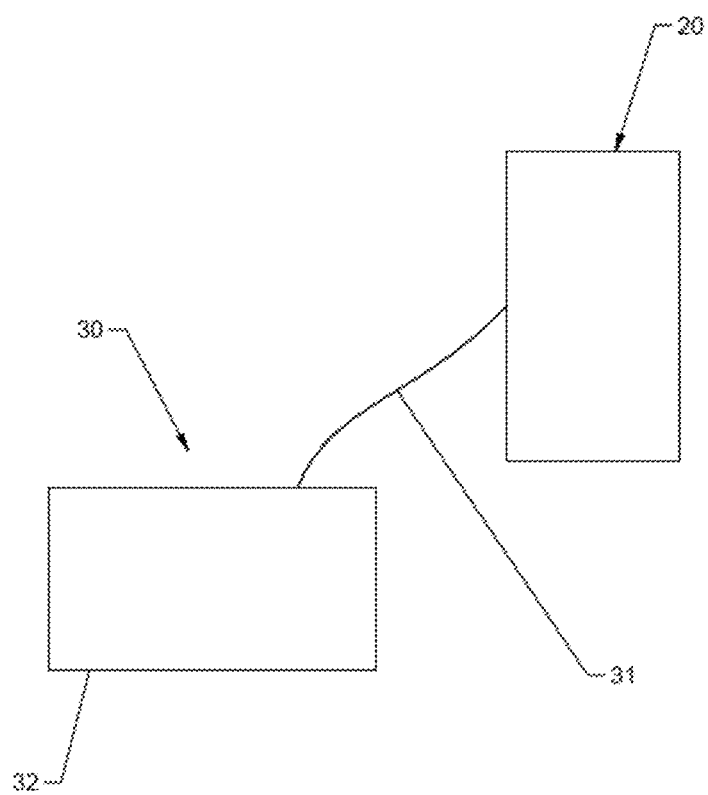
FIG. 3 is a schematic view of an installation system.
Figure 4:
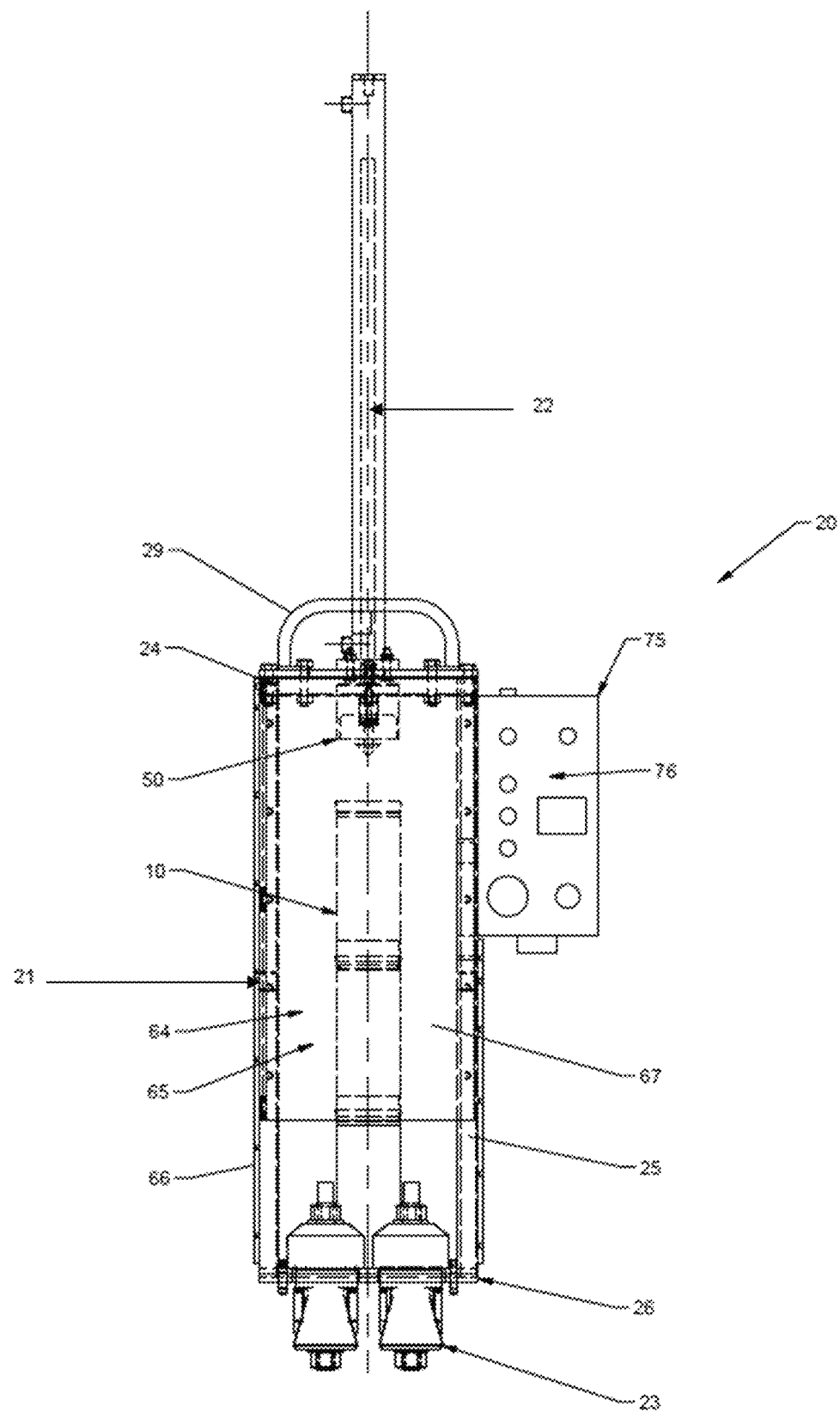
FIG. 4 is a side view of an installation tool of the installation system.

The installation tool 20 may form part of an installation system that additionally comprises a source of motive power 30. The source of motive power 30 may be located outside the tubular reactor 1 and configured to move the movable ram 22 of the installation tool 20. For example, as shown in FIG. 3, one or more hoses 31 may be provided for supplying power from the source of motive power 30 to the installation tool 20. The source of motive power 30 may be a hydraulic, pneumatic, or electrical source. In some embodiments the source of motive power 30 may be an electrical source, for example, an electric motor that may be mounted directly to the installation frame 21. However, in other embodiments, the source of motive power 30 may be a hydraulic source, for example, a hydraulic power unit (HPU) 32, hydraulic power pack or other hydraulic pump. The HPU 32 may be located outside the housing 2 and connected to the installation tool 20, and in particular the movable ram 22, by the one or more hoses 31.

The anchors 23 function to releasably engage the installation frame 21, and hence the installation tool 20, to the tubular reactor 1.

An anchor 23 may be provided for each anchor mount of the installation frame 21. For example, each aperture 28 may have an anchor 23 associated with it.

The anchors 23 may be detachable from the installation frame 21.

Figure 6:
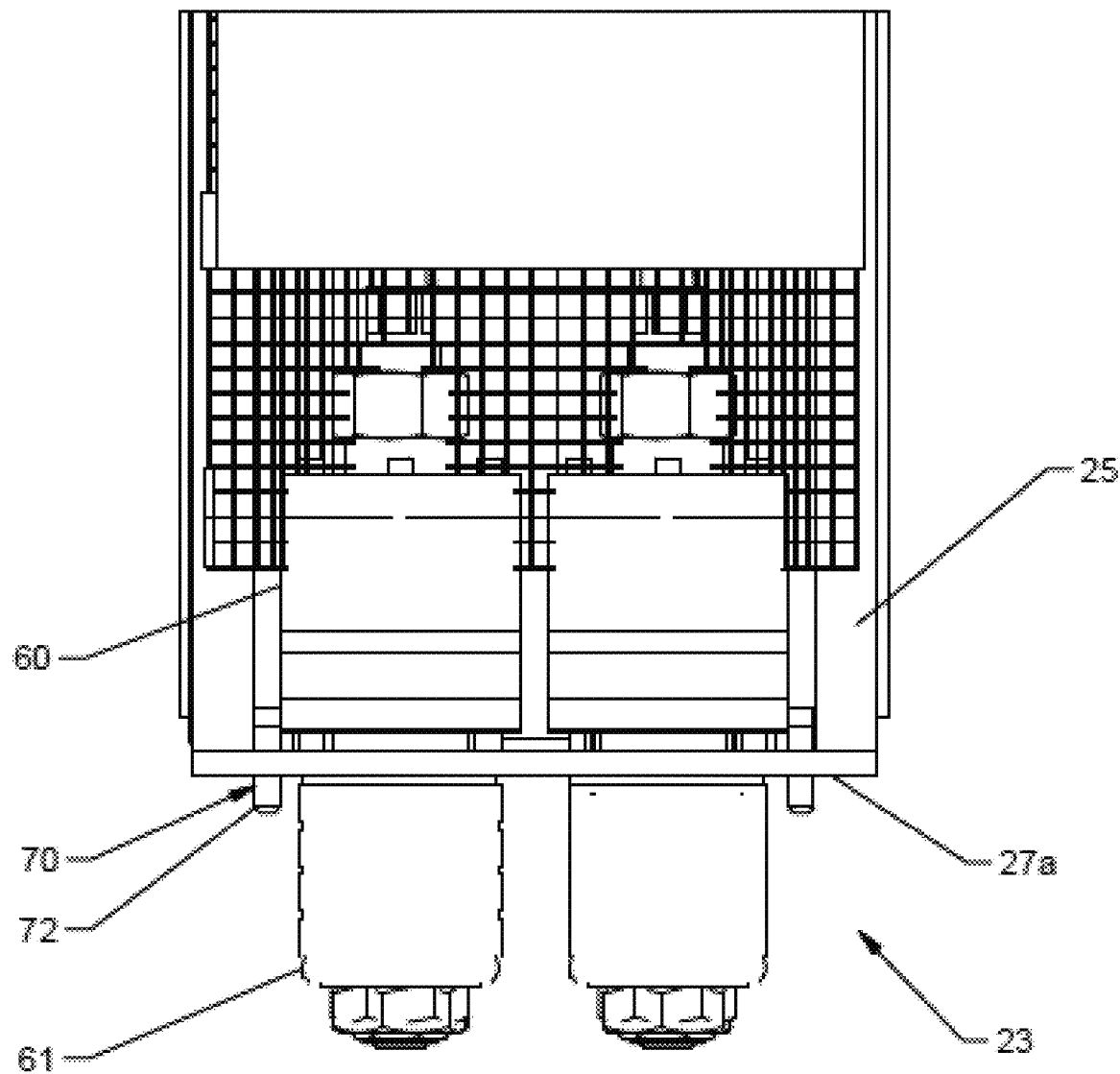
FIG. 6 is an enlarged view of a portion of FIG. 5.
Figure 7:
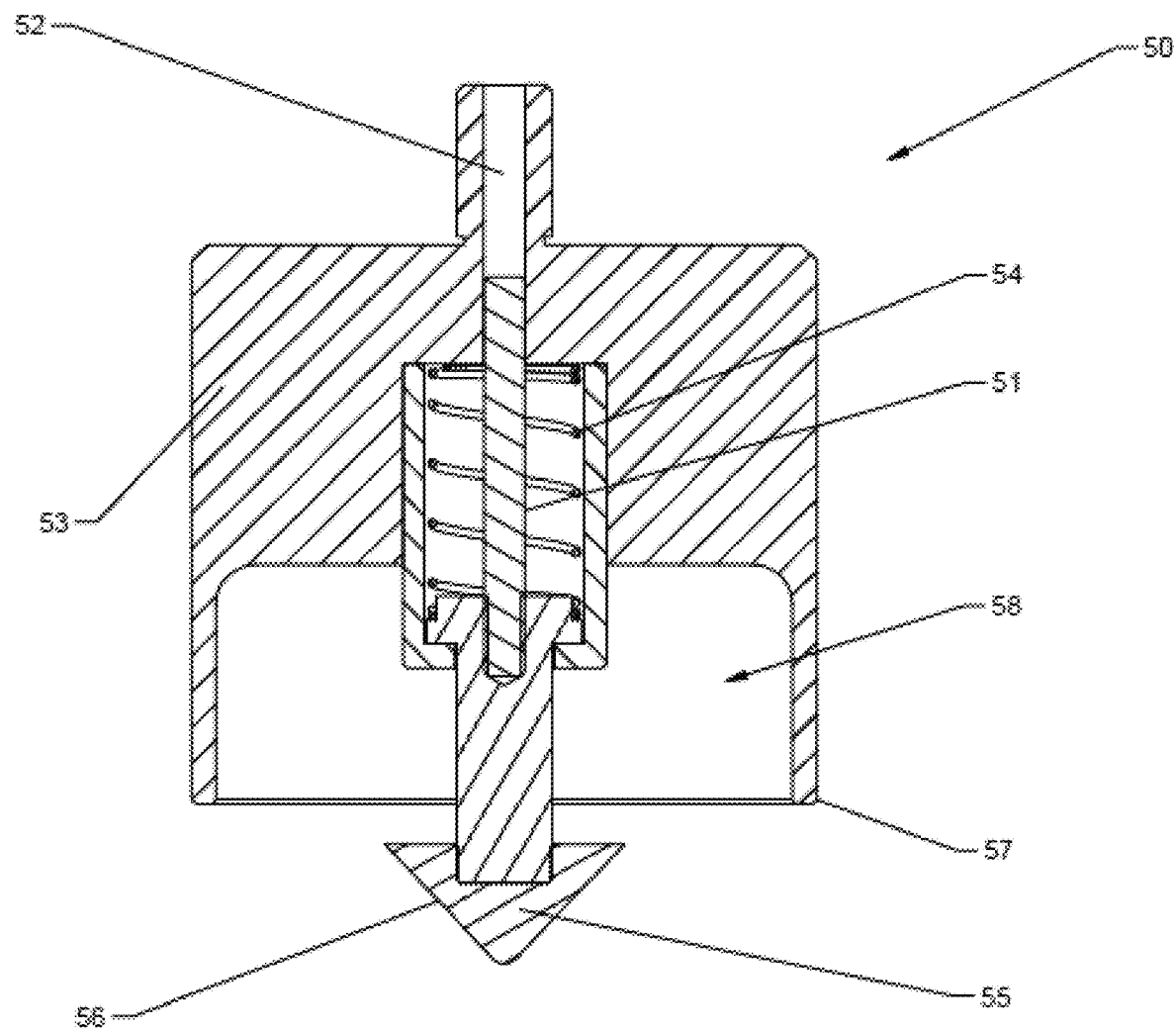
FIG. 7 is a cross-sectional view of an aligning device of the installation tool of FIG. 4.

As shown most clearly in FIG. 6, each anchor 23 may comprise a manually, hydraulically, pneumatically or electrically expandable anchor. Alternatively, each anchor 23 may comprise a sprung-loaded anchor, for example, a sprung-loaded camming device.

In the illustrated example in Figured 5 and 6, the anchors 23 are hydraulically activated and comprise an anchor housing 60 that extends through the aperture 28 and legs 61 that can be expanded radially outwards by hydraulic action. The anchor housing 60 may be coupled to the foot 26 and/or support plate 27a, 27b. The legs 61 may be moved between a retracted configuration in which they may be inserted into the reactor tube 8 and an expanded configuration in which they may grip an inner surface of the reactor tube 8.

Figure 8:
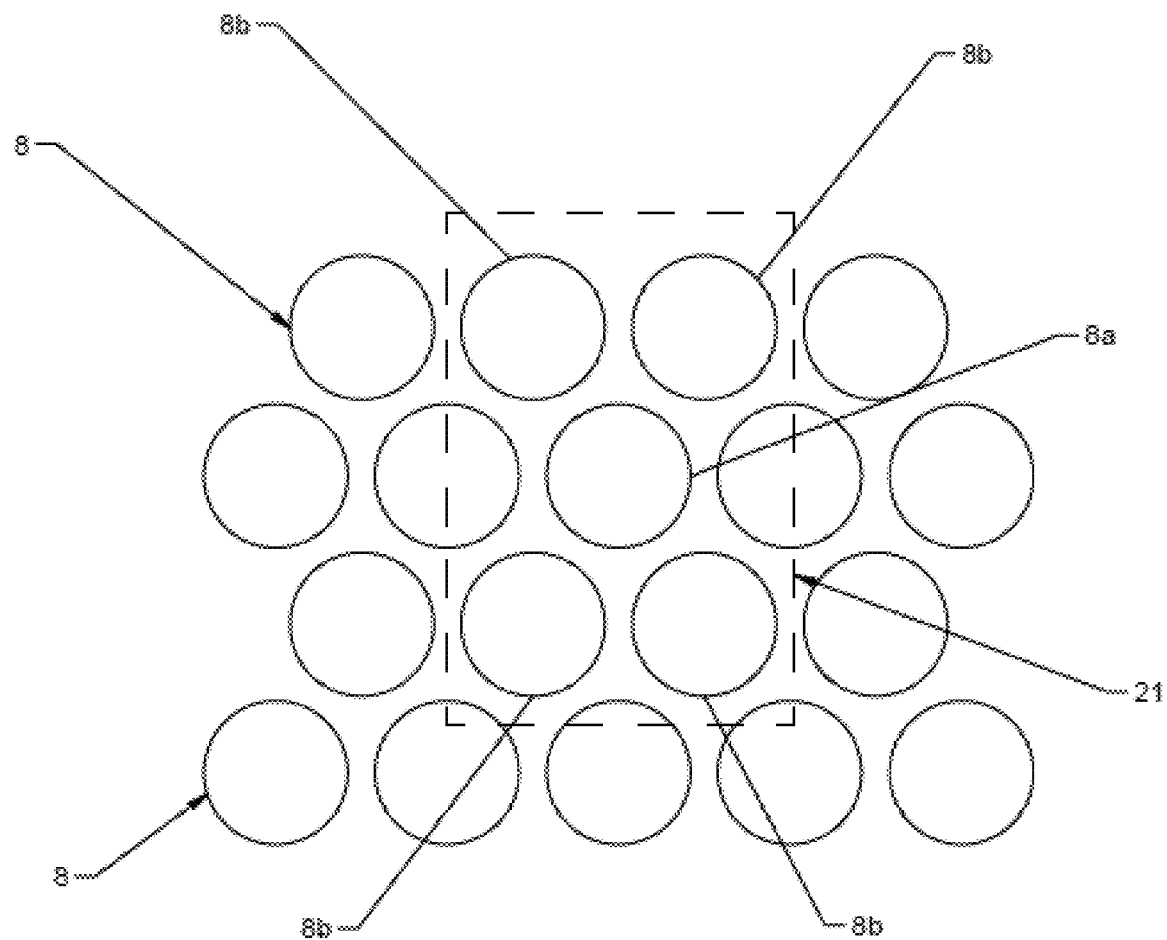
FIG. 8 is a schematic view of a reactor tube layout of the tubular reactor of FIG. 1.

The anchors 23 may be configured for engaging in one or more reactor tubes 8b located alongside the selected reactor tube 8a so as to releasably attach the installation frame 21 to the tubular reactor 1. As shown in FIG. 8, the reactor tubes 8b may be one or more reactor tubes 8 that immediately neighbour the first selected reactor tube 8a or may, alternatively, be one or more reactor tubes that are nearby the first selected reactor tube 8a.

The anchors 23 may be expanded using a manual, hydraulic, pneumatic or electrical motive force. The same source of motive power 30 (e.g. the HPU 32) may be used to actuate the anchors 23 and to move the movable ram 22. Alternatively, the anchors 23 may be actuated by a dedicated source of motive power that is provided on or adjacent to the installation frame 21. For example, a manually operated hydraulic pump may be provided for this function.

The installation tool 20 may also be provided with stabilising feet 70. The stabilising feet 70 may function to stabilise and/or level the installation frame 21 before, during and/or after engagement of the anchors 23 in the reactor tubes 8.

Each stabilising foot 70 may comprise a pin 72 or similar object that projects through an aperture 71 in the installation frame 21. An aperture 71 may be provided in each foot 26 of the installation frame 21. One or more apertures 71 may be provided in each support plate 27a, 27b.

The pin 72 may be axially movable relative to the aperture 71. In one example the pin 72 and aperture 71 may comprise mutually engaging screw threads that allow the pin 72 to be rotated to adjust the proportion of the pin 72 that extends downwards below the foot 26.

The stabilising feet 70 may be used in conjunction with the anchors 23. For example, each anchor 23 may have an associated stabilising foot 70. The stabilising foot 70 may be provided on the anchor 23 or nearby the anchor 23. In the illustrated example of FIG. 5, where the installation frame 21 has a generally quadrilateral basal shape, each corner may be provided with an anchor 23 and a stabilising foot 70.

The stabilising feet 70 may be engaged directly or indirectly by means of a plate against the tube sheet 6, 7 and/or the faces of the reactor tubes 8 prior to engaging the anchors 23 in order to reduce or eliminate lifting or tipping of the installation frame 21 during expansion of the anchors 23.

The installation frame 21 may define a loading station 65 for receiving the one or more catalyst carriers 10. The loading station 65 may comprise a void space 64 within the installation frame 21 that extends from the opening 40 to the aligning device 50, for example in between the support legs 25.

One or more of the lateral sides of the installation frame 21 may be provided with cover panels 66. One lateral side may be provided with a door 67 that may be opened and shut to permit loading of the catalyst carriers 10 into the loading station 65. The door 67 may comprise a door sensor for preventing operation of the movable ram 22 unless the door 67 is closed.

The installation tool 20 may comprise a control unit 75. The control unit 75 may comprise a user interface 76 providing one or more actuators and one or more indicators for controlling and monitoring operation of the installation tool 20. The control unit 75 may be mounted to the installation frame 21 or may be a separate unit that may be operatively connected to at least the movable ram 22. The connection may be a wired or wireless connection.

The installation tool 20 may comprise one or more sensors. As well as the door sensor described above, other sensors may be provided. For example, a tilt sensor may be provided for cutting out operation of the movable ram 22 if an angle of the longitudinal axis of the movable ram 22 deviates from the longitudinal axis of the reactor tube 8 by more than a threshold amount. For example, an insertion force sensor may be provided for limiting a maximum insertion force applied by the movable ram 22.

An example of a catalyst carrier 10 according to the present disclosure that may be used with the installation tool 20 is shown, by way of example, in FIGS. 9 to 13. However, it will be understood that according to the present disclosure the catalyst carriers 10 may take various forms. For example, as well as the examples described herein, the catalyst carriers 10 may take other forms including but not limited to those disclosed in WO2011/048361, WO2012/136971 and WO2016/050520, the contents of which are herein incorporated by reference in their entirety.

The catalyst carrier 10 may generally comprise a container that is sized such that it is of a smaller dimension than the internal dimension of the reactor tube 8 into which it is to be placed in use. Typically, a seal will be provided that is sized such that it interacts with the inner wall of the reactor tube 8 when the catalyst carrier 10 is in position within the reactor tube 8. Parameters such as carrier length and diameter may be selected to accommodate different reactions and configurations of reactor tube 8.

As shown in FIGS. 9 to 13, the catalyst carrier 10 may comprise a container 100 for holding catalyst in use. The container 100 may generally have a bottom surface 101 that closes a lower end of the container 100 and a top surface 102 at an upper end of the container 100. A carrier outer wall 103 may extend from the bottom surface 101 to the top surface 102. A seal 104 may extend from the container 100 by a distance which extends beyond the carrier outer wall 103. The carrier outer wall 103 may have apertures 105 located below the seal 104.

Figure 9:
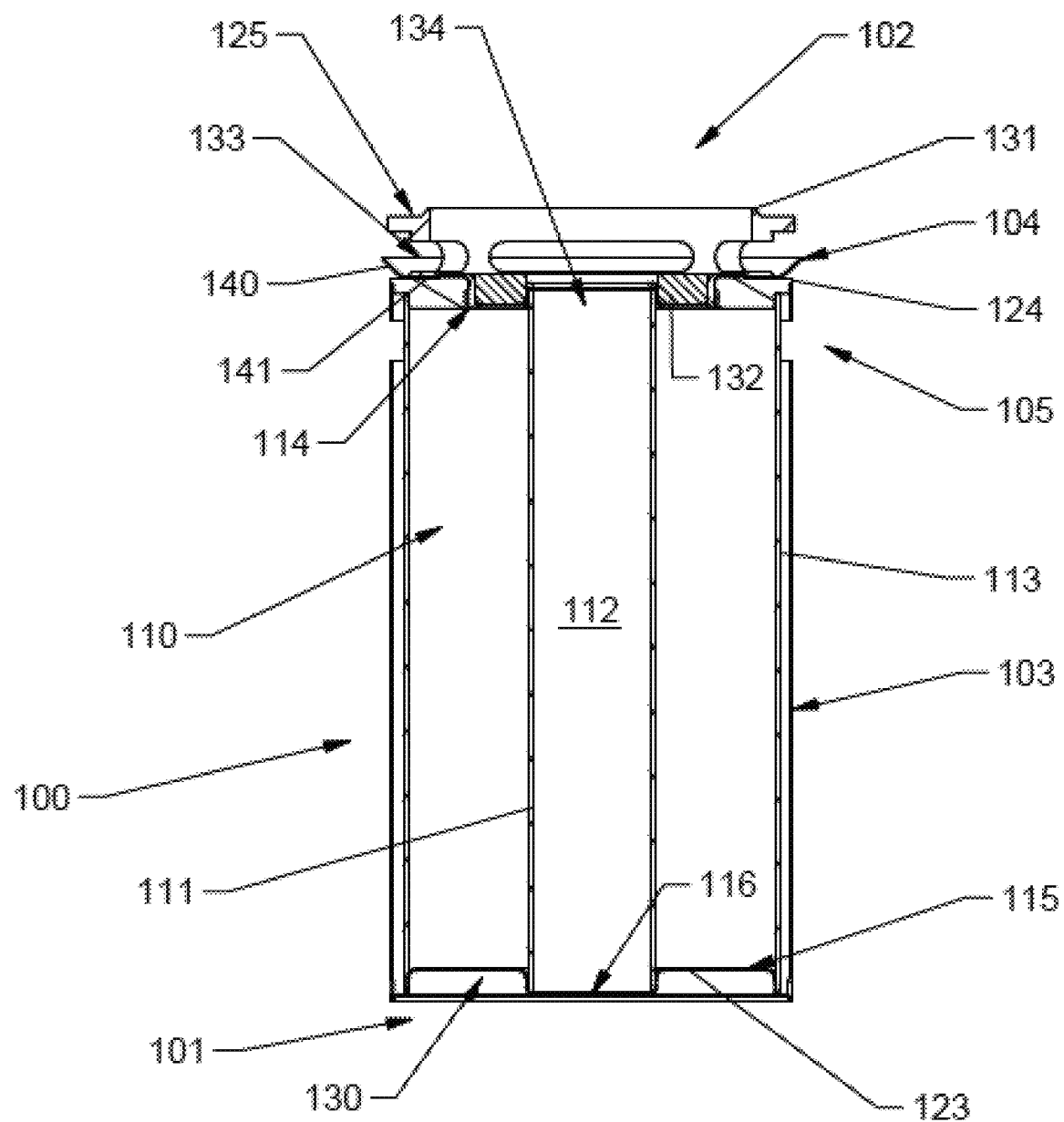
FIG. 9 is a cross-sectional view of a catalyst carrier.

As shown in FIG. 9, in at least some embodiments the catalyst carrier 10 may more particularly comprise an annular container 110 for holding catalyst in use. The annular container 110 may comprise a perforated inner container wall 111 that defines an inner channel 112 and a perforated outer container wall 113 that may be concentrically arranged about the perforated inner container wall 111. An annular top surface 114 may close an upper end of the annular container 110 and an annular bottom surface 115 may close a lower end of the annular container 110. A lower end of the inner channel 112 may be closed off by a channel end surface 116 except for one or more drain apertures (not shown) that may be provided in the lower end of the inner channel 112. The channel end surface 116 may be formed integrally or separately to the inner container wall 111.

Figure 10:
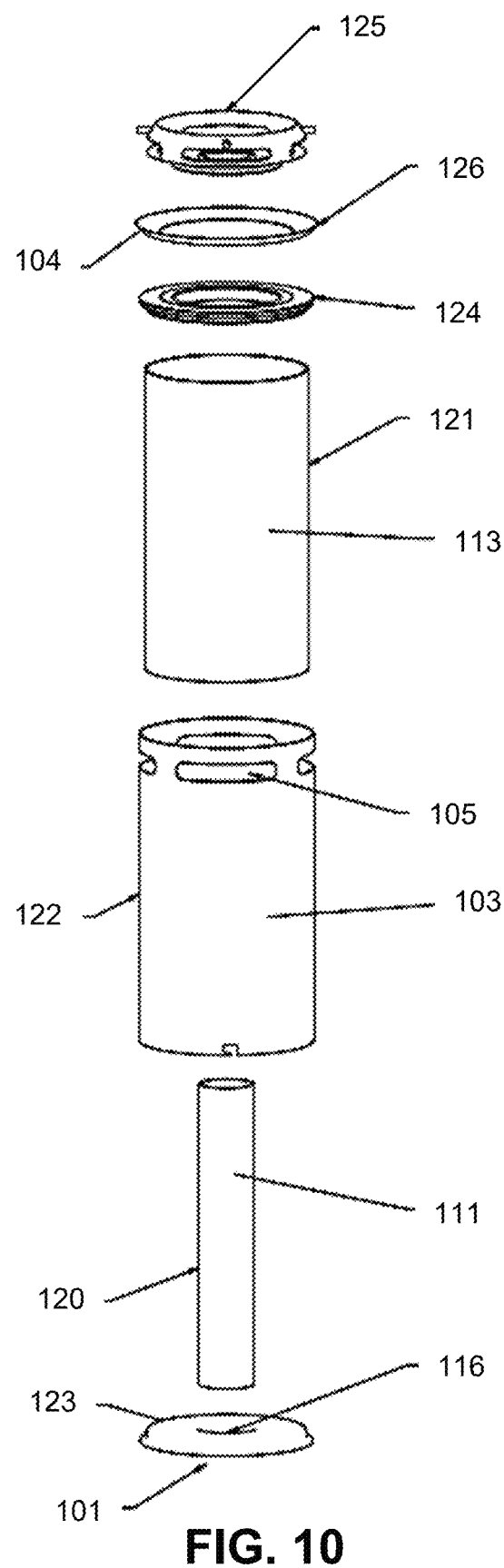
FIG. 10 is an exploded perspective view of the catalyst carrier of FIG. 9.
Figure 11:
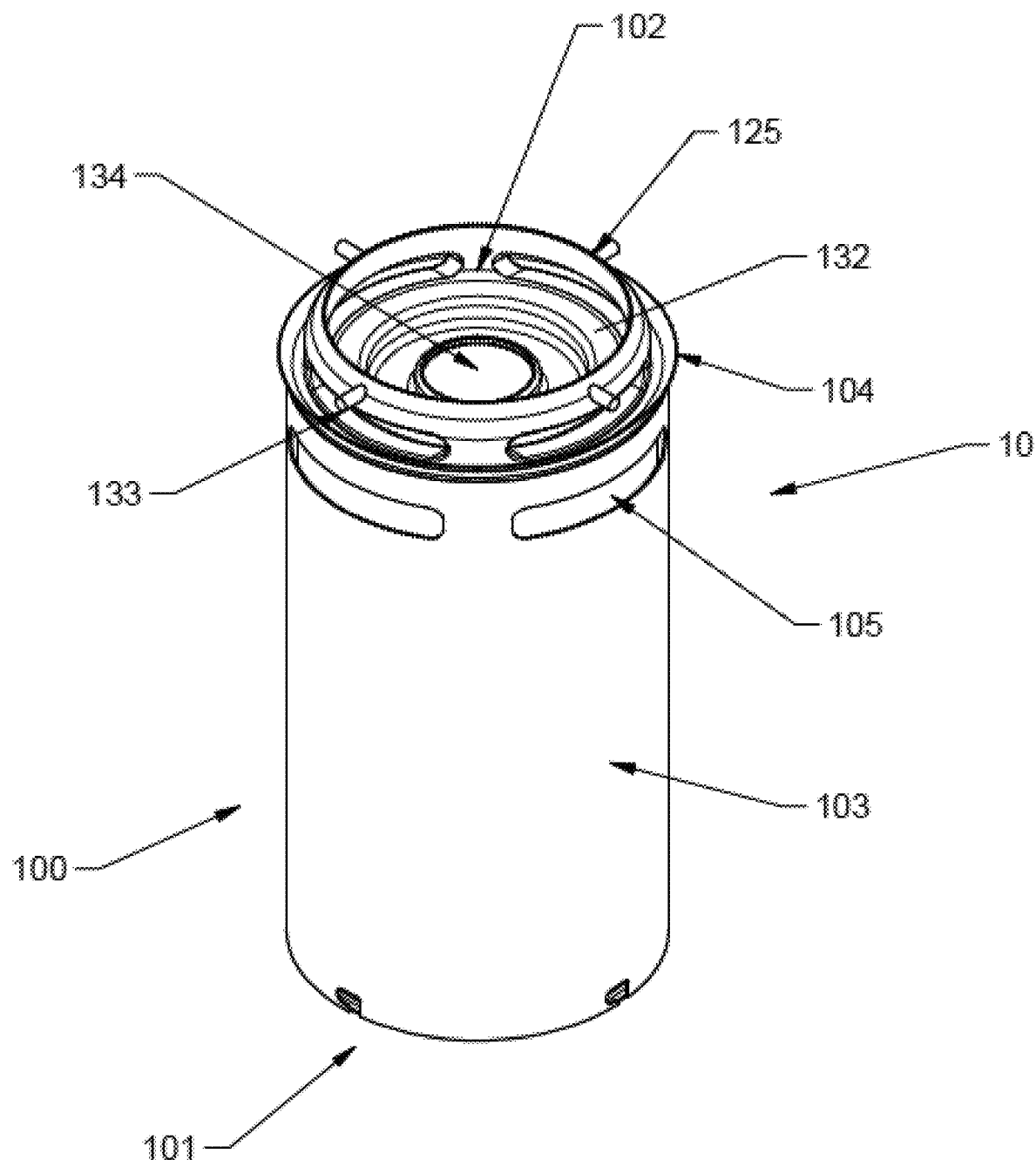
FIG. 11 is a perspective view of the catalyst carrier of FIG. 9.

As shown in the exploded view of FIG. 10, the catalyst carrier 10 may be formed from a number of individual components that may be assembled together by any suitable means, including for example welding. In some embodiments such components may include a perforated inner tube 120, a perforated intermediate tube 121, an outer tube 122, a bottom cap 123, an annular top ring 124, a top cap 125 and an annular seal ring 126.

The catalyst carrier 10 may be formed of any suitable material. Such material will generally be selected to withstand the operating conditions of the reactor. Generally, the catalyst carrier will be fabricated from carbon steel, aluminium, stainless steel, other alloys or any material able to withstand the reaction conditions.

Suitable thicknesses for the components will be of the order of about 0.1 mm to about 1.0 mm, preferably of the order of about 0.3 mm to about 1.0 mm.

The perforated inner tube 120 may comprise the perforated inner container wall 111. The perforated intermediate tube 121 may comprise the perforated outer container wall 113.

The outer tube 122 may comprise the carrier outer wall 103 and define the apertures 105. The bottom cap 123 may comprise the bottom surface 101 and/or the annular bottom surface 115. The bottom cap 123 may also extend across the perforated inner tube 120 to comprise the channel end surface 116. The annular top ring 124 and the top cap 125 may comprise the annular top surface 114 and may comprise at least part of the top surface 102. The annular seal ring 126 may comprise the seal 104.

The size of the perforations in the perforated inner tube 120 and the perforated intermediate tube 121 will be selected such as to allow uniform flow of reactant(s) and product(s) through the catalyst while maintaining the catalyst within the annular container 110. It will therefore be understood that their size will depend on the size of the catalyst particles being used. In an alternative arrangement the perforations may be sized such that they are larger but have a filter mesh covering the perforations to ensure catalyst is maintained within the annular container 110.

It will be understood that the perforations may be of any suitable configuration. Indeed, where a wall or tube is described as perforated, all that is required is that there is means to allow the reactants and products to pass through the walls or tubes.

Figure 13:
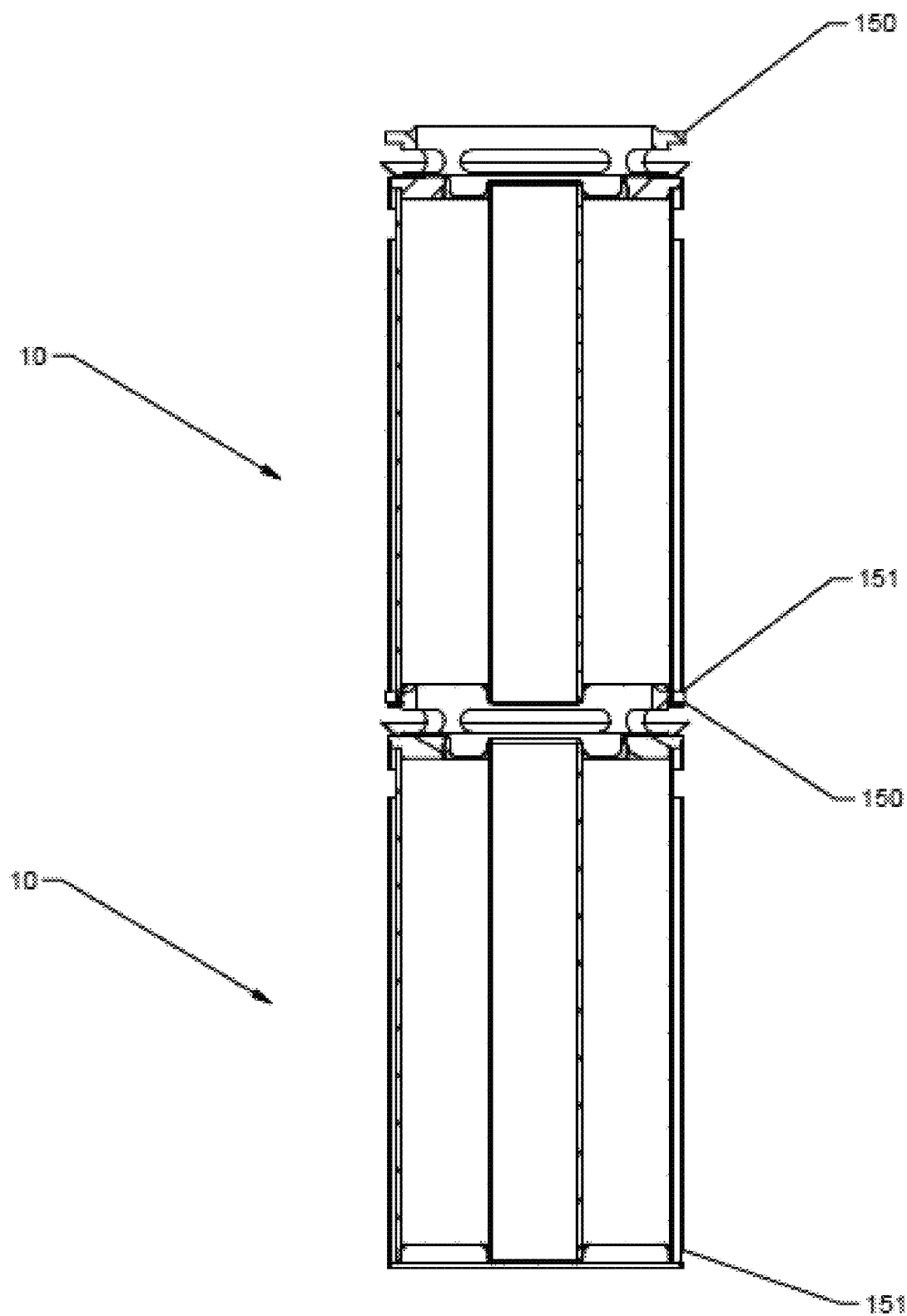
FIG. 13 is a cross-sectional view of the arrangement of FIG. 12.
Figure 14:
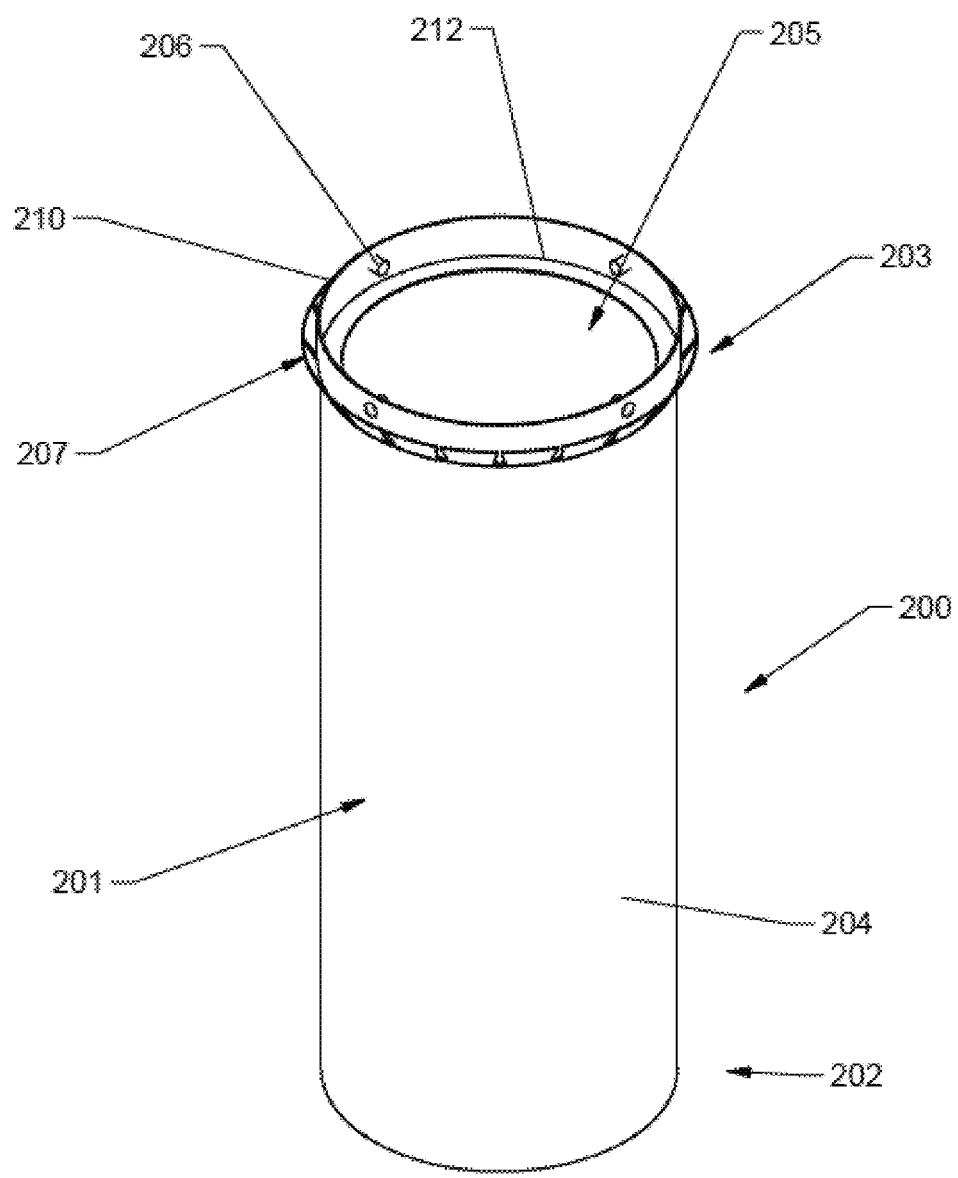
FIG. 14 is a perspective view of a support unit.
Figure 15:
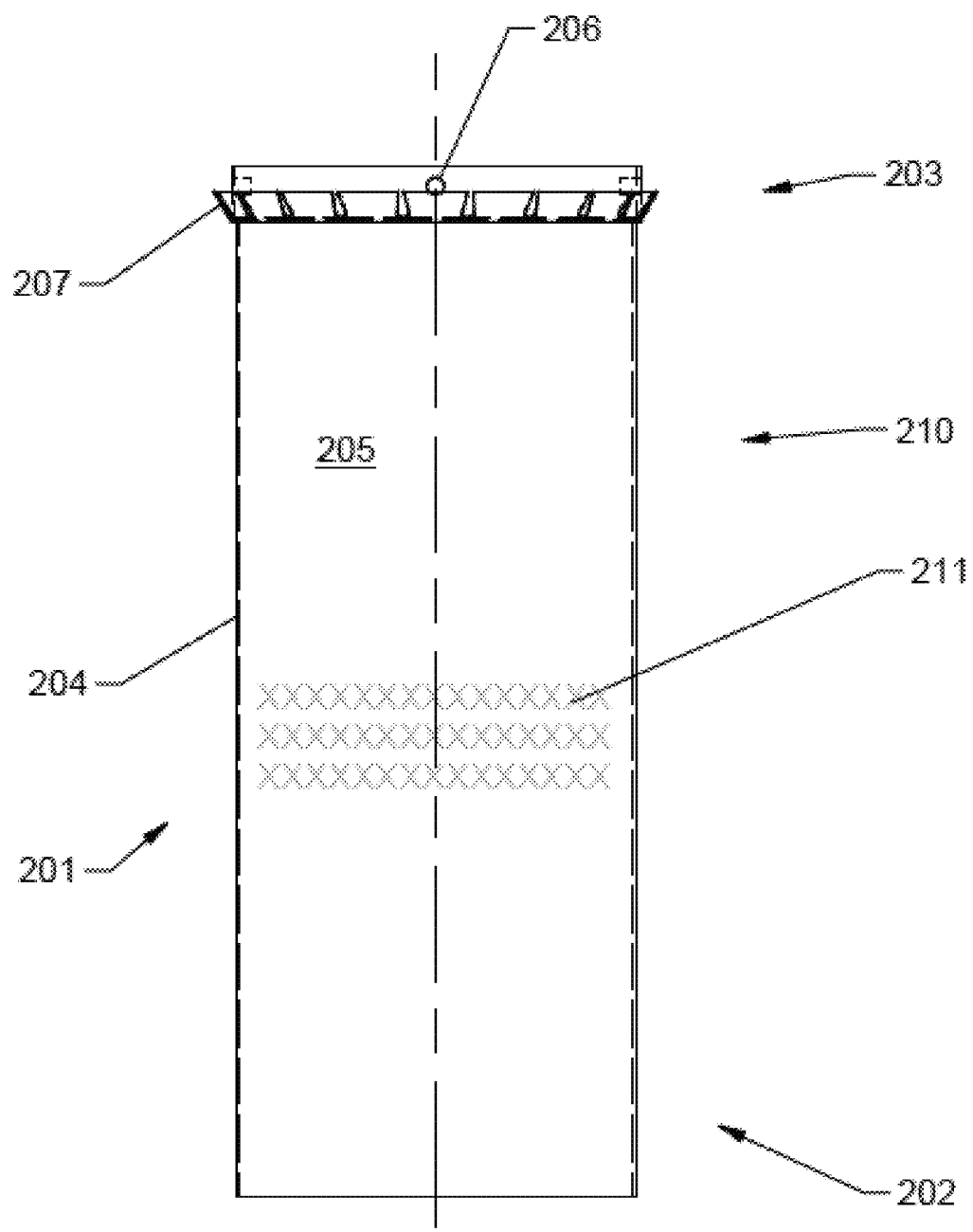
FIG. 15 is a side view of the support unit of FIG. 14.

The bottom surface 101, for example the bottom cap 123, may be shaped to engage with an upper end of another catalyst carrier 10. For example, the bottom surface 101 may comprise an annular recess 130 around the perforated inner tube 120. The top cap 125 may be shaped to engage in the annular recess 130 of another catalyst carrier 10. For example, the top cap 125 may comprise an annular ring 131 that upstands from an annular plug body 132. The annular ring 131 may be shaped and sized to be received in the annular recess 130 as shown in FIG. 13.

The bottom surface 101, for example the bottom cap 123 and/or channel end surface 116 may include one or more drain holes. Where one or more drain holes are present, they may be covered by a filter mesh.

The annular top ring 124 may be shaped and sized to engage in an upper end of the outer tube 122. The annular plug body 132 of the top cap 125 may have an outer diameter configured to engage with a central aperture of the annular top ring 124. Engagement of the top cap 125 with the annular top ring 124 may function to sandwich and retain the annular seal ring 126 in position.

The top cap 125 may comprise a central inlet 134 in the annular plug body 132 for enabling entry of liquids and gases into the upper end of the inner channel 112. The annular ring 131 may comprise lateral apertures 133 than enable liquids and gases to reach the central inlet 134.

The carrier outer wall 103 may be smooth or it may be shaped. Suitable shapes include pleats, corrugations, and the like.

The apertures 105 in the carrier outer wall 103 may be of any configuration. In some embodiments, the apertures 105 may be holes or slots.

The seal 104 may be formed in any suitable manner. However, it will generally be sufficiently compressible to accommodate the smallest diameter of the reactor tube 8. The seal 104 will generally be a flexible, sliding seal. In some embodiments the seal 104 may comprise a deformable flange 140 extending from the carrier outer wall 103 or the top surface 102 of the catalyst carrier 10. The flange 140 may be sized to be larger than the internal diameter of the reactor tube 8 such that as the catalyst carrier 10 is inserted into the reactor tube 8 it is deformed to fit inside and interact with the reactor tube 8.

In the illustrated example of FIG. 9, the deformable flange 140 comprises an outer portion of the annular seal ring 126. An inner portion 141 of the annular seal ring 126 may define a clamping surface that is sandwiched and retained between the top cap 125 and the annular top ring 124. The deformable flange 140 may be angled relative to the inner portion 141. The deformable flange 140 may be angled towards the upper end of the catalyst carrier 10.

The carrier outer wall 103 may continue above the seal 104. Thus the seal 104 may be located at the top of the catalyst carrier 10, optionally as part of the top surface 102, or it may be located at a suitable point on the carrier outer wall 103 provided that it is located above the apertures 105 in the carrier outer wall 103.

The catalyst carriers 10 may be configured to enable them to be attached together in a stacked arrangement. For example, adjacent catalyst carriers 10 may be engaged together by engagement of the one or more co-operating formations.

In some embodiments each catalyst carrier 10 may comprise upper co-operating formations 150 provided on or towards the upper end of the container 100 and lower co-operating formations 151 provided on or towards the lower end of the container 100.

Adjacent catalyst carriers 10 may be engaged together by engagement of the lower co-operating formations 151 on one catalyst carrier 10 with the upper co-operating formations 150 of an adjacent catalyst carrier 10.

The upper co-operating formations 150 and the lower co-operating formations 151 may be configured to be engaged and disengaged by relative rotational movement of the adjacent catalyst carriers 10. For example, the upper co-operating formations 150 and the lower co-operating formations 151 may take the form of bayonet fittings.

In some embodiments the upper co-operating formations 150 are provided above the seal 104. For example, the upper co-operating formations 150 may be provided on or as part of the annular ring 131 and/or an upper portion of the carrier outer wall 103.

Figure 12:
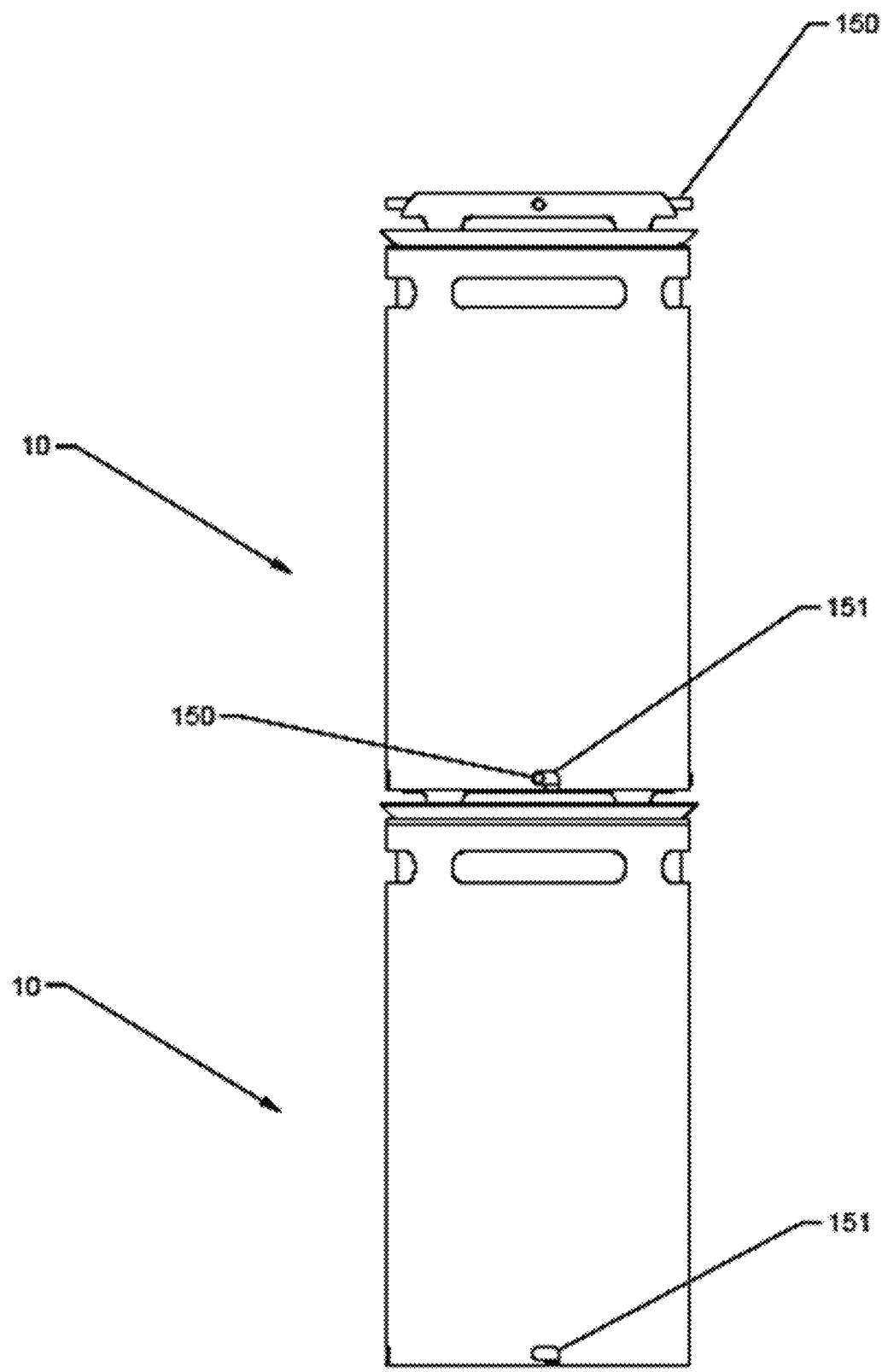
FIG. 12 is a side view of a stacked arrangement of two catalyst carriers.

Two or more of the catalyst carriers 10 may be engaged together to form an insertion set as shown for example in FIGS. 12 and 13. The insertion set may comprise, for example, two, three or more catalyst carriers 10 that are stacked one on top of the other. The catalyst carriers 10 may be permanently engaged together by a means such as welding.

However, more preferably the catalyst carriers 10 are releasably engaged together. The releasable engagement may be, for example, by means of the co-operating formations 150, 151 discussed above.

The loading station 65 of the installation tool 20 may be configured to hold an insertion set of one, two, three, or more catalyst carriers 10, and the movable ram 22 may be configured for pushing the insertion set of catalyst carriers 10 into the first selected reactor tube 8a in a single stroke.

The installation tool 20 may be used for installing catalyst carriers 10 into the first selected reactor tube 8a of the tubular reactor 1. Use of the installation tool 20 will be described, by way of example only, when positioned in the head space 3.

In a first step the installation frame 21 may be inserted into the head space 3 or footer space 5 of the tubular reactor 1 through the access opening 11 of the tubular reactor 1. The installation frame 21 may be lifted by the handles 29 manually or by using a hoist.

The installation frame 21 may be connected to the source of motive power 30 by the hoses that may pass through the access opening 11.

Next, the installation frame 21 may be positioned on the upper tube sheet 6. The installation frame 21 may be aligned with the selected reactor tube 8a that is to be filled such that the upper end of the selected reactor tube 8a is aligned with the opening 40 between the feet 26 of the installation frame 21.

Next, if any of the feet 26 and their apertures 28 are not aligned with a reactor tube 8b that is alongside the selected reactor tube 8a then the anchor 23 of each such foot 26 may be detached.

Next, the one or more anchors 23 that remain attached to the installation frame 21 may be inserted into the reactor tubes 8b such that the feet 26, and support plates 27a, 27b where present, are brought into contact with the upper faces of the reactor tubes 8 and/or the upper tube sheet 6. The feet 26 and/or support plates 27a, 27b may span across the upper face of more than one reactor tube 8.

Next, the installation frame 21 may be stabilised using the one or more stabilising feet 70. The pins 72 may be actuated to engage against the upper tube sheet 6 between the reactor tubes 8. A stabilising foot 70 may in particular be engaged against the upper tube sheet 6 at each position where an anchor 23 has been detached. However stabilising feet 70 may also be engaged at locations still having an anchor 23 present.

Next, the stabilising feet 70 may be adjusted to level the installation frame 21 and/or to ensure that the longitudinal (e.g. vertical) axis of the movable ram 22 is aligned with the longitudinal axis of the selected reactor tube 8a.

Next, the door 67 may be opened and a catalyst carrier 10 or an insertion set comprising a plurality of catalyst carriers 10 may be loaded into the loading station 65.

Next, with the door 67 again closed, the installation tool 20 may be actuated by operation of the user interface 76 to actuate the movable ram 22. The movable ram 22 may then push the one or more catalyst carriers 10 into the first selected reactor tube 8a.

During the movement of the movable ram 22, the aligning device 50 may capture and bring the catalyst carriers 10 into vertical alignment. The conical face 56 of head 55 on pin 51 may engage in the central inlet 134 of the uppermost catalyst carrier 10 during an initial movement of the movable ram—in particular before the rim 57 contacts the uppermost catalyst carrier 10. Due to the angled face of the conical face 56 the movement of the head 55 will urge the uppermost catalyst carrier 10 (and any other connected catalyst carriers 10) towards a correct vertical alignment. During a subsequent movement of the movable ram 22 the pin 51 may be retracted into the bore 52 against the bias of the spring 54 such that the rim 57 may be brought into engagement with the top surface 102 of the catalyst carrier 10 with the annular ring 131 being accommodated in the void space 58 of the aligning device 50. During subsequent movement of the movable ram 22 the catalyst carrier 10 may be forcibly driven into the reactor tube 8a.

The process may be repeated one or more times to push one or more additional insertion sets of catalyst carriers 10 into the selected reactor tube 8a.

Once the selected reactor tube 8a has been filled with catalyst carriers 10 to the extent desired the installation frame 21 may be detached by disengaging the one or more anchors 23. The installation frame 21 may then be moved to be aligned with another selected reactor tube 8a and reattached in the same manner as described above. Thus, the installation tool 20 may be used to sequentially fill each reactor tube 8 of the tubular reactor 1.

The installation tool 20 may be configured to install catalyst carriers 10 into two or more reactor tubes 8 simultaneously. For example, the movable ram 22 may comprise a first ram portion for pushing catalyst carriers 10 into a first selected reactor tube 8a and a second ram portion for simultaneously pushing catalyst carriers 10 into a second selected reactor tube 8a. A third ram portion could also be provided for a filling simultaneously a third selected reactor tube 8a. Four or more ram portions could be provided as desired. The ram portions may be driven by a common actuator, for example a single hydraulic piston.

During insertion into the reactor tube 8, the seal 104 of the catalyst carrier 10 may sealingly engage with the inner surface of the reactor tube 8. In particular, engagement of the seal 104 against the reactor tube 8 may cause deformation of the seal 104.

The deformation of the seal 104 may produce resistive forces that may help to maintain the axial position of the catalyst carriers 10 within the reactor tube 8 after installation. In addition, the deformation of the seal 104 may be used to promote a liquid-tight and/or gas-tight seal between the upper end of the catalyst carriers 10 and the inner surface of the reactor tube 8.

Once installed in the reactor tube 8, the catalyst carriers 10 may form a stacked arrangement, one on top of the other with their longitudinal axes aligned and coincident.

In use in a tubular reactor 1 with downflow, reactant(s) flow downwardly through the reactor tube 8 and thus first contact the top surface 102 of the uppermost catalyst carrier 10 in the stacked formation. The seal 104 blocks the passage of the reactant(s) around the side of the catalyst carrier 10. Therefore, the top surface 102 directs the reactants inwardly through the lateral apertures 133 into the central inlet 134 at the upper end of the inner channel 112 within the inner container wall 111 defined by the perforated inner tube 120.

The reactant(s) then enters the annular container 110 through the perforated inner tube 120 and then passes radially through the catalyst bed towards the outer container wall 113 defined by the perforated intermediate tube 121. During this passage the reactant(s) contact the catalyst and reaction occurs to form product(s).

Unreacted reactant(s) and product(s) then flow out of the annular container 110 through the perforated intermediate tube 121. The carrier outer wall 103 defined by the outer tube 122 then directs reactant(s) and product(s) upwardly between the inner surface of the carrier outer wall 103 and the perforated intermediate tube 121 until they reach the apertures 105 in the carrier outer wall 103. They are then directed through the apertures 105 and flow downwardly between the outer surface of the carrier outer wall 103 and the inner surface of the reactor tube 8 where heat transfer takes place.

The unreacted reactant(s) and product(s) may then contact the top surface 102 of the underlying catalyst carrier 10 in the stacked formation and the process described above may repeat. This pattern may repeat as the reactant(s) and product(s) pass down the stacked formation until they are collected out of the lower end of the reactor tube 8.

Some of the products, especially liquid products, may drain out of the inner channel 112 through the drain hole provided in the channel end surface 116 into the inner channel 112 of the underlying catalyst carrier 10. Such products may then continue to drain down the stacked formation of the catalyst carriers 10 and be collected out of the lower end of the reactor tubes 8.

According to another aspect of the present disclosure there is provided a support unit 200 for installation into the reactor tube 8 of the tubular reactor 1.

As shown, by way of example in FIGS. 14 to 17, the support unit 200 comprises an elongate body 201 having a first end 202 configured to engage against a support surface of the tubular reactor 1 when the support unit 200 is installed in the reactor tube 8 and a second end 203 configured to engage against an end of a stack of catalyst carriers 10 abutting the support unit 200.

The elongate body 201 may comprise a tubular member 204. The tubular member 204 may be hollow and define an inner bore 205 that extends completely through the elongate body 201 from the first end 202 to the second end 203.

The diameter of the elongate body 201 may be configured to engage with the catalyst carriers 10. For example, an upper rim 210 of the elongate body 201 provided at or towards the second end 203 may have a diameter sized to engage against the bottom surface 101 of the catalyst carrier 10, for example against the bottom cap 123. In some embodiments the upper rim 210 may be sized to engage within the annular recess 130 of the catalyst carrier 10.

The support unit 200 may further comprise a spacer element 207 for aligning the support unit 200 with the inner surface of the reactor tube 8. The spacer element 207 may extend radially outwardly from the elongate body 201.

The materials and any contents of the support unit 200 may be non-reactive with respect to the intended process conditions of the tubular reactor 1.

The elongate body 201 may be provided with an identifying marking 211 to indicate that it does not contain catalyst. The identifying marking 211 may be, for example, etched, printed, painted or applied on or to an outer surface of the elongate body 201.

The support unit 200 may be attachable to one or more catalyst carriers 10 to form an insertion set. For example, the support unit 200 may comprise one or more co-operating formations 206 for engaging one or more co-operating formations of the one or more catalyst carriers 10. The co-operating formations 206 may be provided on or towards the second end 203. In some embodiments the co-operating formations 206 may be configured to engage the lower co-operating formations 151 provided on or towards the lower end of the container 100 of the catalyst carrier 10.

The co-operating formations 206 and the lower co-operating formations 151 may be configured to be engaged and disengaged by relative rotational movement. For example, the co-operating formations 206 and the lower co-operating formations 151 may take the form of bayonet fittings.

In use, the support unit 200 and the plurality of catalyst carriers 10 may be installed into the reactor tube 8 such that the support unit 200 is aligned with the lower tube sheet 7 and the plurality of catalyst carriers 10 are arranged in a stacked arrangement abutting the support unit 200 such that all of the catalyst within the reactor tube 8 is located within the heat-exchange zone 4. For example, all of the catalyst within the reactor tube 8 may be located above the level of the lower tube sheet 7 within the heat-exchange zone 4.

Figure 17:
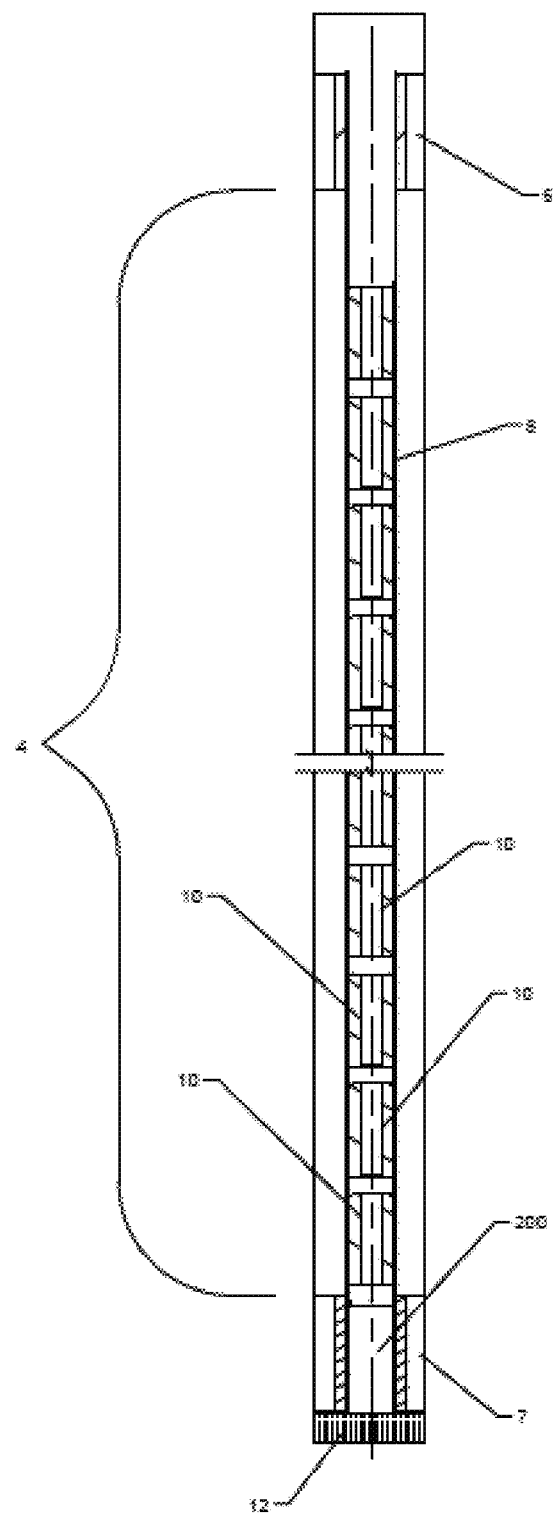
FIG. 17 is a schematic cross-sectional view of the support unit of FIG. 14 installed in a reactor tube with a plurality of catalyst carriers.

To facilitate this, the length of the elongate body 201 may be suitably configured to support the stack of catalyst carriers 10 with the lowermost catalyst carrier 10 being above the level of the lower tube sheet 7, as shown in FIG. 17.

Typically, after insertion the support unit 200 will be located at the bottom of the stacked arrangement. The support unit 200, and in particular the first end 202, may be engaged against a support surface 12 of the tubular reactor 1.

During installation, for example in a vertically orientated tubular reactor 1, the support unit 200 may be pushed first into the upper end of the reactor tube 8 followed by the plurality of catalyst carriers 10. The support unit 200 may be installed on its own or as part of an insertion set, with the support unit 200 foremost. Alternatively the catalyst carriers 10 and support unit 200 may be installed into the lower end of the reactor tube 8 with the support unit 200 being installed last.

Figure 16:
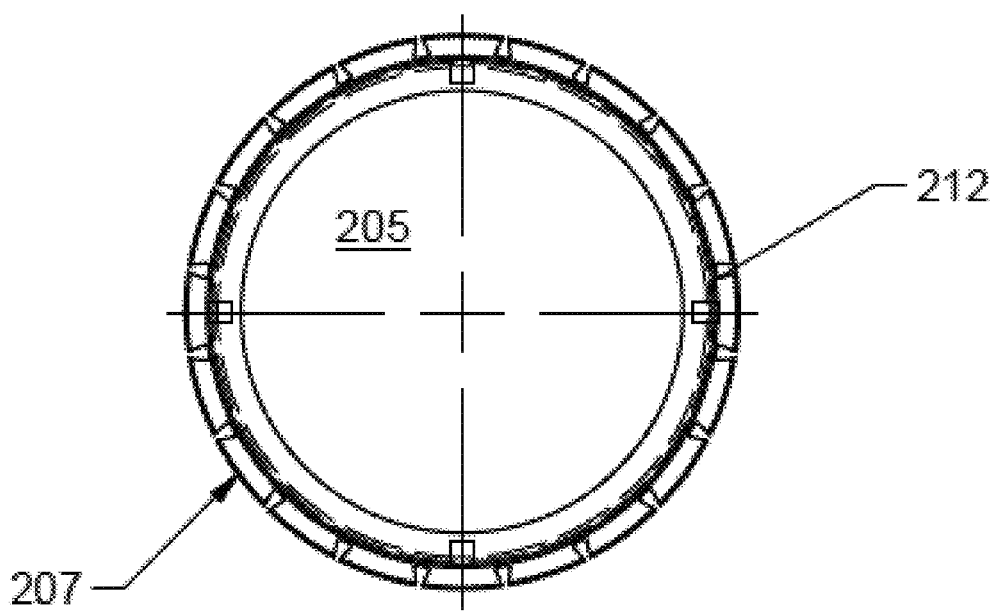
FIG. 16 is a top plan view of the support unit of FIG. 14.

The support unit 200 may be installed into the reactor tube 8 using the installation tool 20 as described above. In particular, the second end 203 may be configured to be pushed by the movable ram 22. For example, the elongate body 201 may be provided with a flange 212, as shown in FIG. 16, at or towards the second end 203 that is sized and shaped to be engaged by the rim 57 of the aligning device 50.

According to another aspect of the present disclosure there is provided a spacer unit 300 for installation into the reactor tube 8 of the tubular reactor 1.

Figure 18:
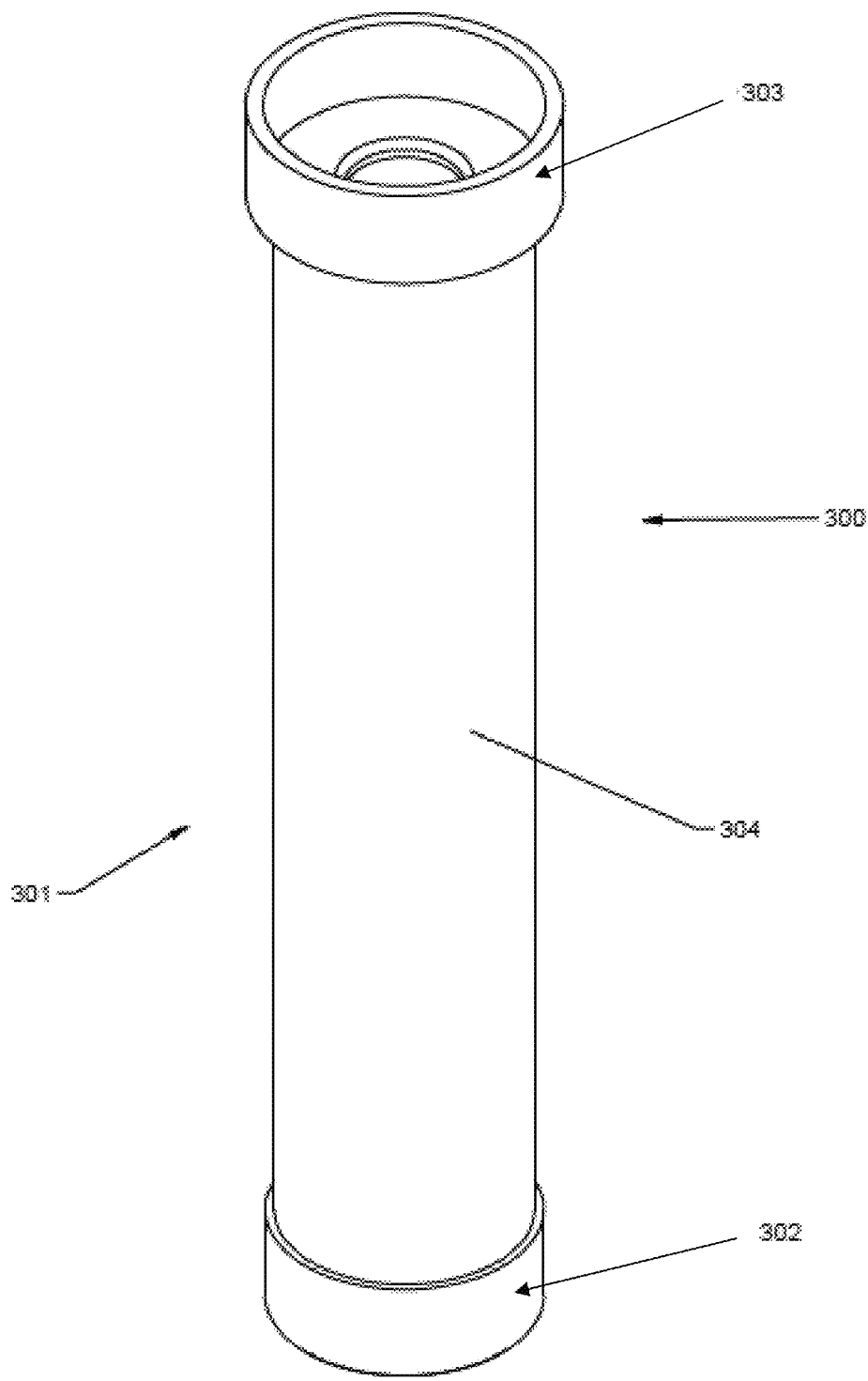
FIG. 18 is a perspective view of a spacer unit.
Figure 19:
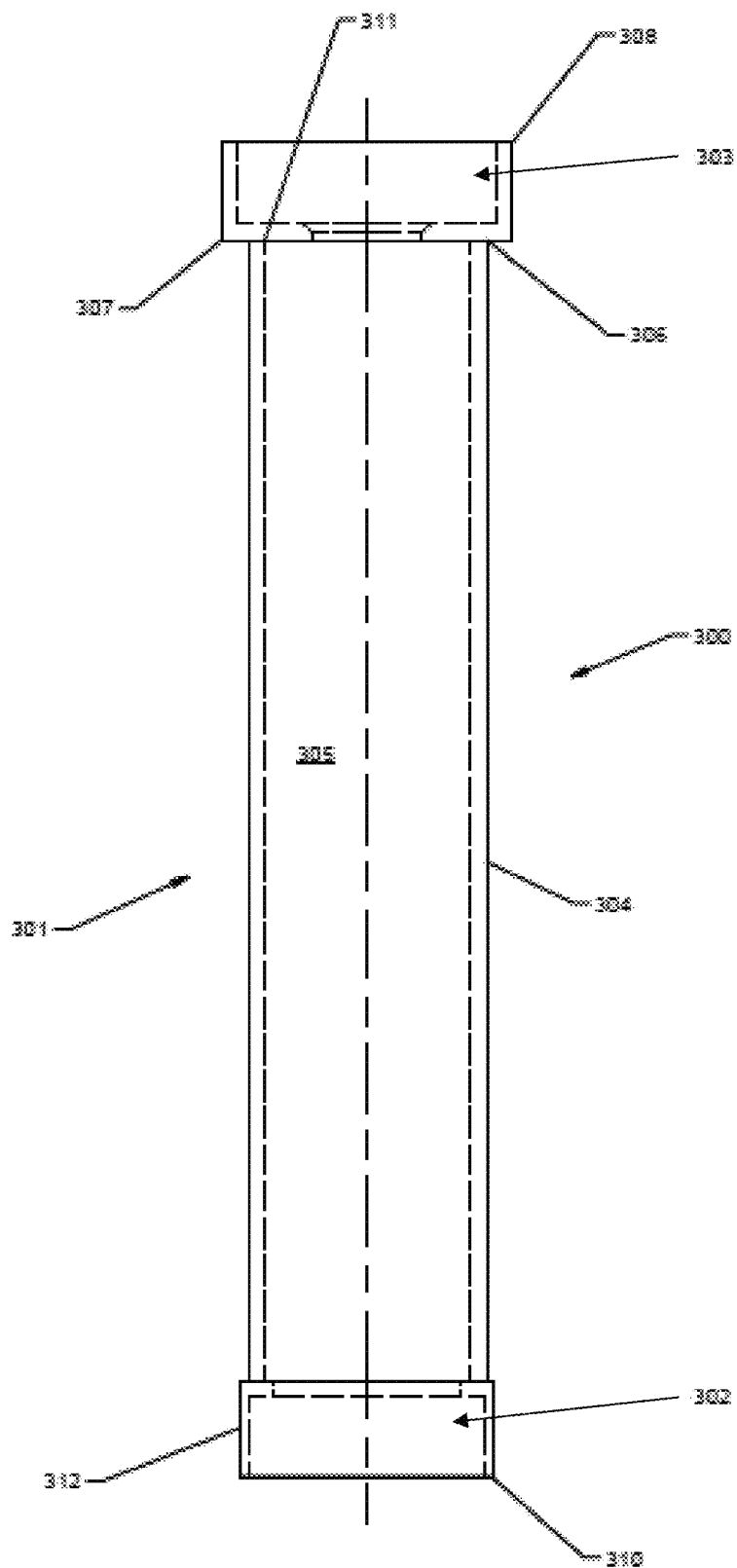
FIG. 19 is a cross-sectional view of the spacer unit of FIG. 18.
Figure 20:
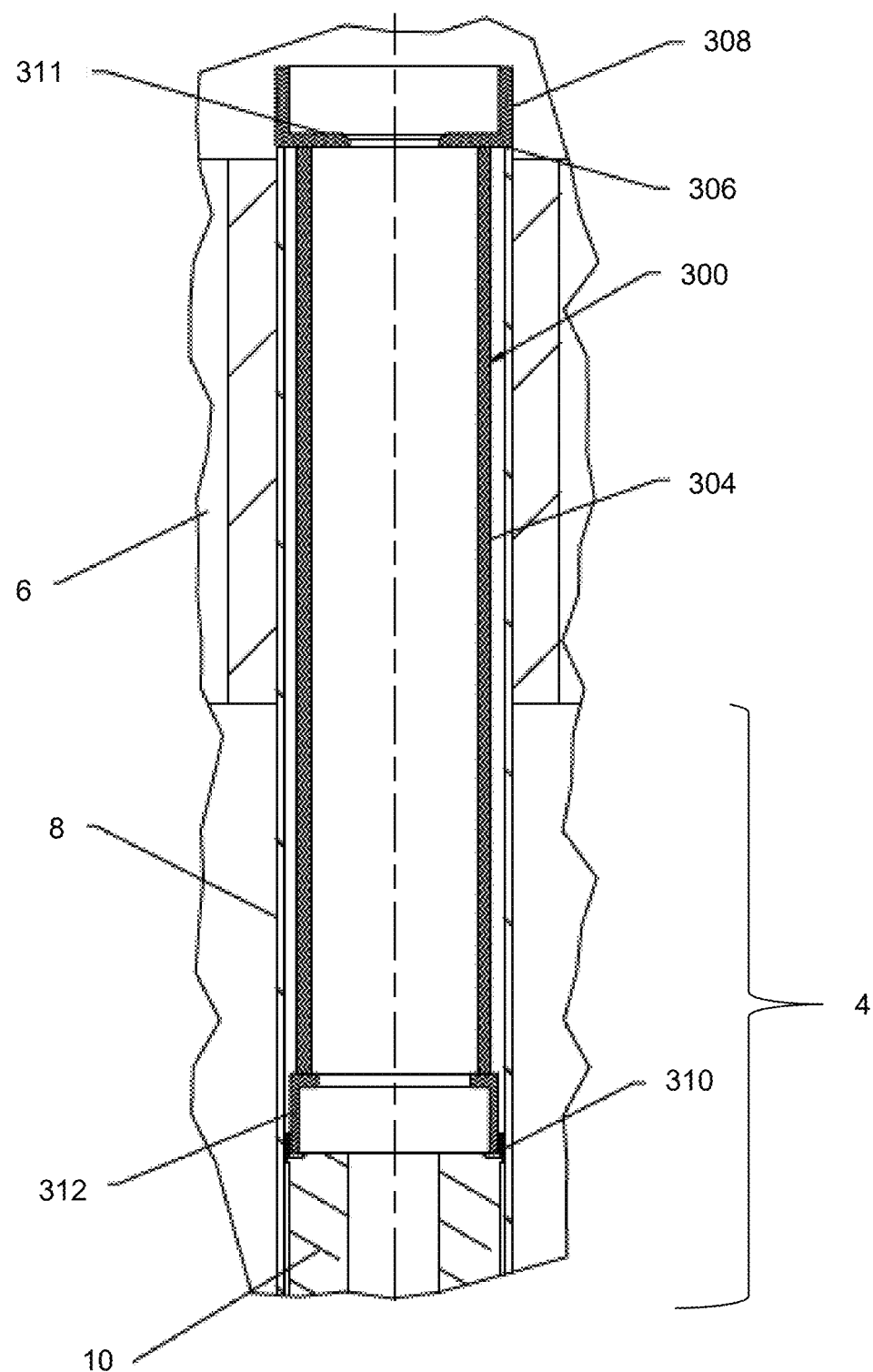
FIG. 20 is a schematic cross-sectional view of the spacer unit of FIG. 18 installed in a reactor tube above a catalyst carrier.

As shown, by way of example in FIGS. 18 to 20, the spacer unit 300 comprises an elongate body 301 having a first end 302 configured to engage against an end of a stack of catalyst carriers 10 and a second end 303 configured to engage against an installation tool, which may be the installation tool 20 as described above.

The elongate body 301 may comprise a tubular member 304. The tubular member 304 may be hollow and define an inner bore 305 that extends completely through the elongate body 301 from the first end 302 to the second end 303.

The elongate body 301 may comprise an abutment face 306 for engaging against a datum face of the reactor tube 8, optionally against an end face of the reactor tube 8. The abutment face 306 may be provided at or towards the second end 303. The abutment face 306 may comprise an outwardly extending flange 307 having an outer diameter configured to be greater than an internal diameter of the reactor tube 8.

The second end 303 of the elongate body 301 may comprise a socket 308 for engaging with the movable ram 22 of the installation tool 20. An inner flange 311 may be provided within the socket 308 that may be engaged by the movable ram 22, in particular the rim 57 of the aligning device 50.

The diameter of the elongate body 301 may be configured to engage with the catalyst carriers 10. For example, a lower rim 310 of the elongate body 301 provided at or towards the first end 302 may have a diameter sized to engage against the top surface 102 of the catalyst carrier 10, for example against the top cap 125 and/or annular top ring 124 and/or the upper end of the carrier outer wall 103. For example, the lower rim 310 may be provided on an annular skirt 312.

The materials and any contents of the spacer unit 300 may be non-reactive with respect to the intended process conditions of the tubular reactor 1.

In use, the catalyst carriers 10 may be installed into the reactor tube 8 (for example as described above) followed by the spacer unit 300 such that the spacer unit 300 is aligned with the upper tube sheet 6 and the catalyst carriers 10 are arranged in a stacked arrangement abutting the spacer unit 300 such that all of the catalyst within the reactor tube 8 is located within the heat-exchange zone 4, as shown in FIG. 20.

A position of the endmost (for example, top) catalyst carrier 10 of the stacked arrangement in the reactor tube 8 may be controlled by fixing a length of the spacer unit 300 between the lower rim 310 and the abutment face 306, and inserting the spacer unit 300 into the reactor tube 8 until the abutment face 306 is engaged against a datum face of the reactor tube 8, for example against an upper end face of the reactor tube 8.

The length of the elongate body 301 may be configured to enable displacement of the stack of catalyst carriers 10 sufficiently into the reactor tube 8 such that all of the catalyst within the reactor tube 8 is located within the heat-exchange zone 4.

The spacer unit 300 may be installed so as to be located at the level of the upper tube sheet 6 with the catalyst carriers 10 arranged in the stacked arrangement beneath the spacer unit 300 such that all of the catalyst within the reactor tube 8 is located beneath the level of the upper tube sheet 6 within the heat-exchange zone 4.

After installation of the catalyst carriers 10 into the desired position the spacer unit 300 may be left in the reactor tube 8 or may alternatively be removed from the reactor tube 8 to leave an endmost catalyst carrier 10 of the stacked arrangement positioned at a point such that the catalyst in the endmost catalyst carrier is located within the heat-exchange zone 4.

Optionally, a secondary spacer unit may be installed against the endmost catalyst carrier in place of the spacer unit 300. The secondary spacer unit may span between the endmost catalyst carrier 10 and a support surface of the tubular reactor 1. For example, the support surface may be an upper support grid that extends across an open end of the reactor tube 8. The secondary spacer unit may mitigate or prevent upward creep of the catalyst carriers 10 within the reactor tube 8 during operation of the tubular reactor 1.

According to another aspect of the present disclosure there is provided an ejector unit 400 for use in discharging the catalyst carriers 10 from the reactor tube 8.

Figure 21:
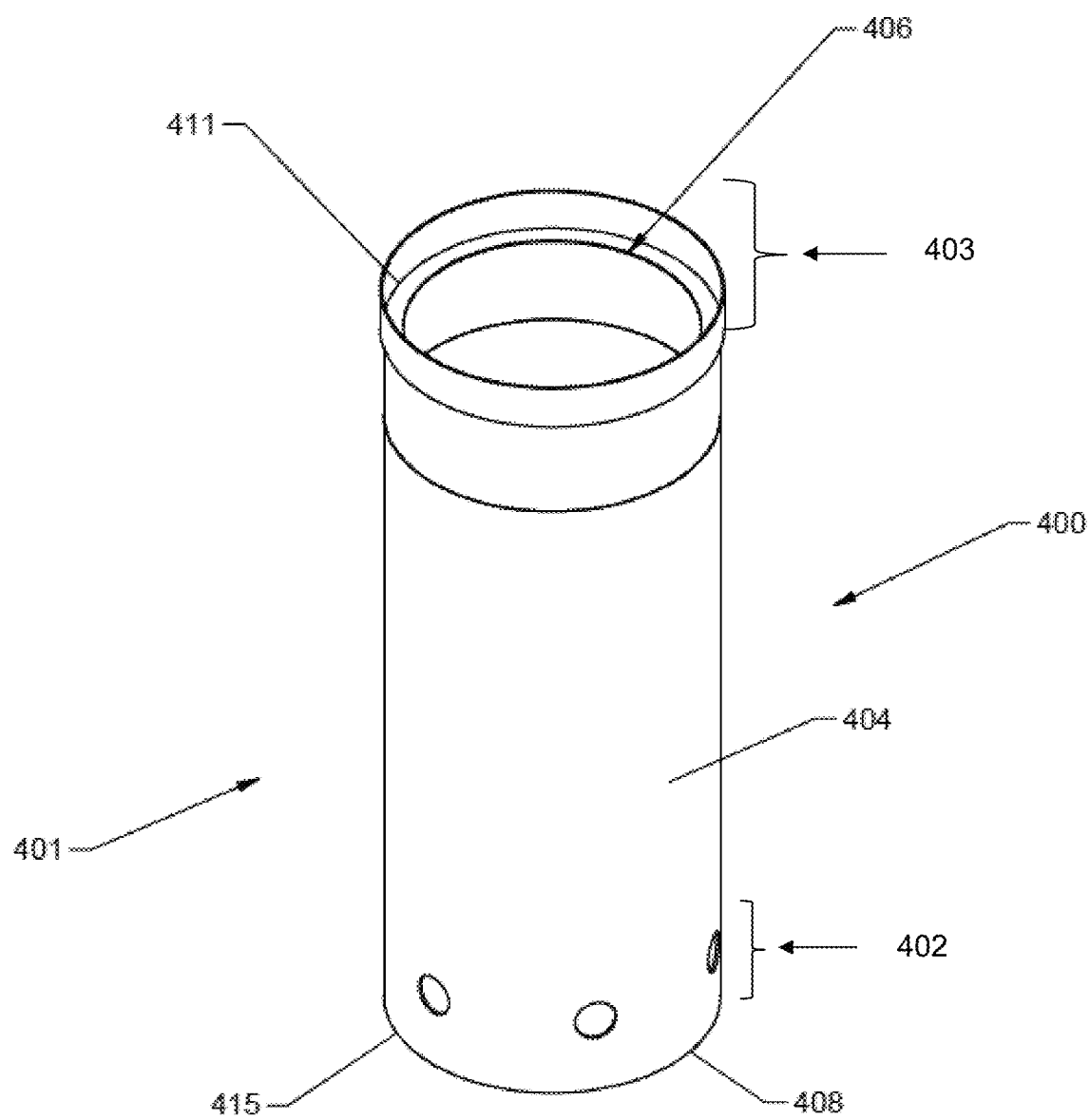
FIG. 21 is a perspective view of an ejector unit.
Figure 22:
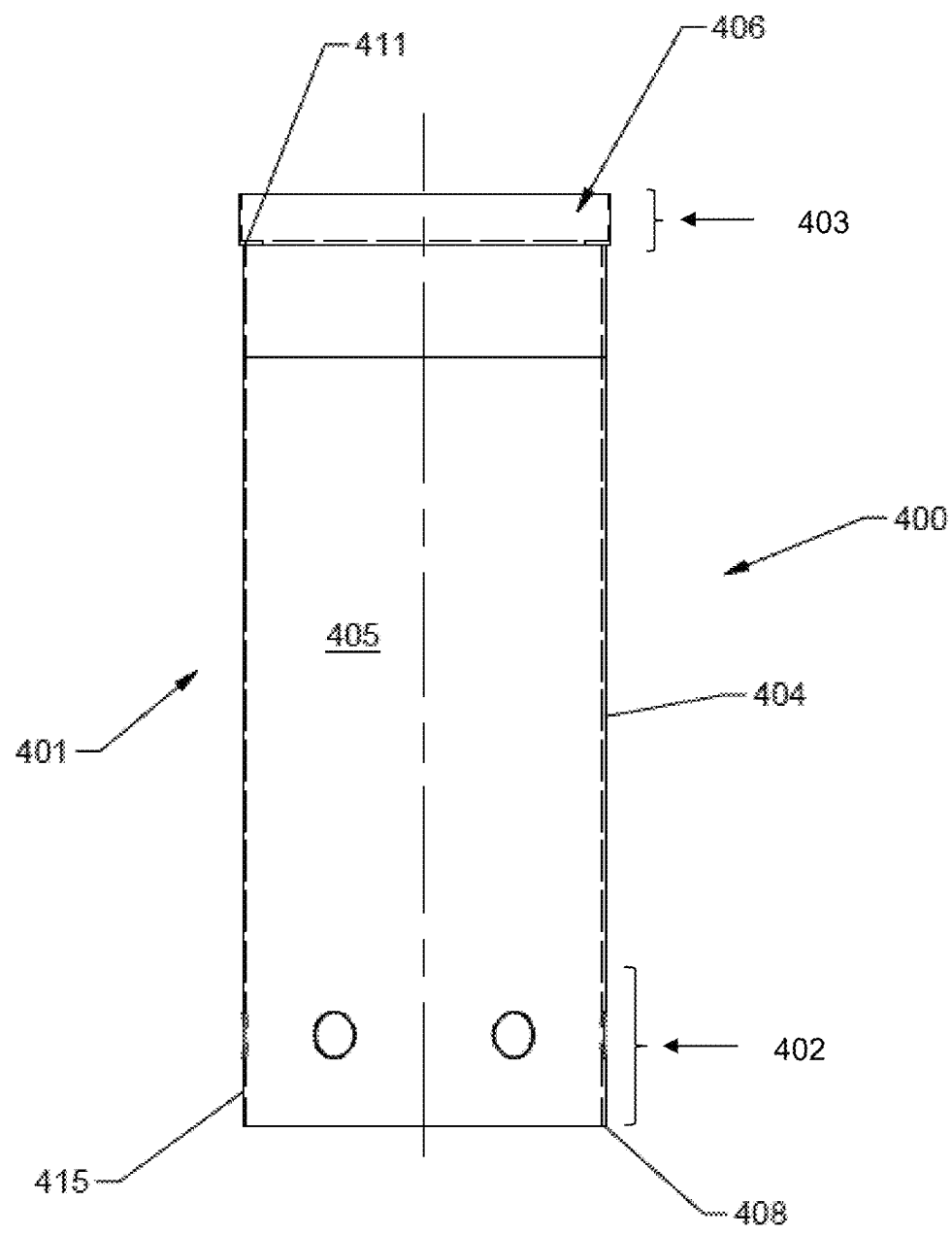
FIG. 22 is a side view of the ejector unit of FIG. 21.
Figure 23:
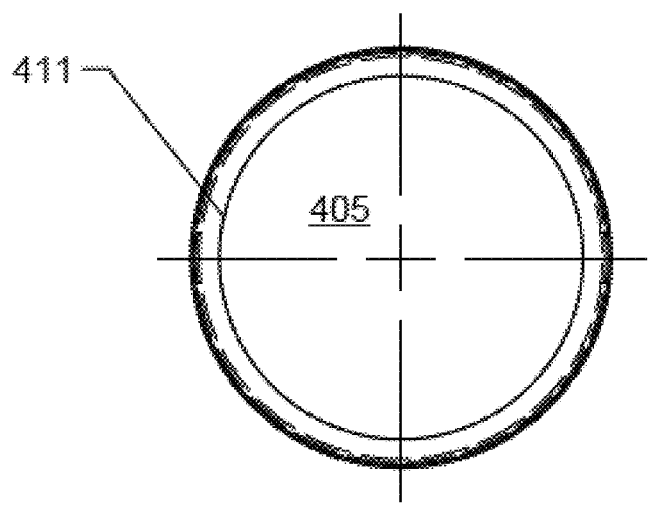
FIG. 23 is a top plan view of the ejector unit of FIG. 21.

As shown, by way of example in FIGS. 21 to 23, the ejector unit 400 comprises an elongate body 401 having a first end 402 configured to engage against an end of a stack of catalyst carriers 10 and a second end 403 configured to engage against an installation tool, which may be the installation tool 20 as described above.

The elongate body 401 may comprise a tubular member 404. The tubular member 404 may be hollow and define an inner bore 405 that extends completely through the elongate body 401 from the first end 402 to the second end 403.

A maximum diameter of the elongate body 401 is configured to be less than an inner diameter of the reactor tube 8 so that the ejector unit 400 can slide freely within the reactor tube 8.

The first end 402 of the ejector unit 400 may also be configured to engage against a second end 403 of another ejector unit 400.

The ejector units 400 may be attachable to one another to form an ejection set.

The ejector unit 400 may comprise co-operating formations provided on or towards the first end 402 for engaging co-operating formations (not shown) on or towards the second end 403 of another ejector unit 400.

The second end 403 of the elongate body 401 may comprise a socket 406 for engaging with the movable ram 22 of an installation tool 20. An inner flange 411 may be provided within the socket 406 that may be engaged by the movable ram 22, in particular the rim 57 of the aligning device 50.

The first end 402 may comprise a skirt 415 for engaging with an end of a catalyst carrier 10 and/or an end of another ejection unit 400. For example, a lower rim 408 of the skirt 415 may have a diameter sized to engage against the top surface 102 of the catalyst carrier 10, for example against the top cap 125 and/or annular top ring 124 and/or the upper end of the carrier outer wall 103. The lower rim 408 may also be sized to engage against the inner flange 411 of an underlying ejector unit 400.

In use, a reactor tube 8 that is initially at least partially filled with catalyst carriers 10 may be emptied (partially or wholly) by first installing a first ejection set of one or more of the ejector units 400 into, in one embodiment, an upper end of the reactor tube 8 to contact and displace downwardly an uppermost catalyst carrier 10 within the reactor tube 8 to thereby push the catalyst carriers 10 within the reactor tube 8 towards the lower end of the reactor tube 8.

The installation tool 20 may be used to push the ejector units 400 into the reactor tube 8.

One or more additional ejection sets of one or more of the ejector units 400 may subsequently be inserted to contact and further displace downwards the ejector units 400 already within the reactor tube 8 to thereby push the catalyst carriers 10 further towards the second end of the reactor tube 8.

In this manner some or all of the catalyst carriers 10 in the reactor tube 8 may be displaced to the lower end of the reactor tube 8 and discharged out of the lower end.

After discharging the last of the catalyst carriers 10 out of the lower end of the reactor tube 8 the plurality of ejector units 400 may slide out of the lower end of the reactor tube 8 under the action of gravity since they are freely slidable within the reactor tube 8.

Further aspects and embodiments of the present disclosure are set out in the following clauses:

Clause A1. A method of installing catalyst carriers into a first selected reactor tube of a tubular reactor, the method comprising the steps of:
i) providing an installation tool, the installation tool comprising:
 a) an installation frame;
 b) a movable ram mounted to the installation frame and configured for pushing one or more catalyst carriers into the first selected reactor tube; and
 c) one or more anchors for releasably attaching the installation frame to the tubular reactor;
ii) attaching the installation tool to the tubular reactor by engaging the one or more anchors in one or more reactor tubes located alongside the first selected reactor tube so as to align the movable ram with the first selected reactor tube; and
iii) actuating the movable ram to push the one or more catalyst carriers into the first selected reactor tube.

Clause A2. The method of clause A1, wherein in step ii) the installation tool is attached such that the installation frame is located in a head space or footer space of the tubular reactor outside of the reactor tubes; and optionally the installation frame is located above an upper tube sheet of the tubular reactor or below a lower tube sheet of the tubular reactor.

Clause A3. The method of clause A1 or clause A2, wherein step i) further comprises inserting the installation tool into a head space or footer space of the tubular reactor through an access opening of the tubular reactor.

Clause A4. The method of any preceding clause, wherein the movable ram is a powered ram or a manually driven ram.

Clause A5. The method of clause A4, wherein the movable ram is switchable from a powered mode in which the movable ram moves under power and a manual mode in which the movable ram is manually driven.

Clause A6. The method of any preceding clause, wherein the installation tool is coupled to a source of motive power for moving the movable ram which is located outside the tubular reactor; and optionally wherein the source of motive power comprises a hydraulic, pneumatic, or electrical source.

Clause A7. The method of any one of clauses A1 to A6, wherein the installation tool comprises a source of motive power which is located inside the tubular reactor for moving the movable ram; and optionally wherein the source of motive power comprises a hydraulic, pneumatic, or electrical source.

Clause A8. The method of any preceding clause, wherein in step iii) an insertion set of one, two, three, or more catalyst carriers are pushed into the first selected reactor tube by a single stroke of the movable ram.

Clause A9. The method of clause A8, wherein step iii) is repeated one or more times to push one or more additional insertion sets into the first selected reactor tube.

Clause A10. The method of clause A8 or clause A9, wherein pushing an insertion set into a first end of the first selected reactor tube causes one or more catalyst carriers to be pushed out of a second end of the first selected reactor tube.

Clause A11. The method of any preceding clause, further comprising detaching from the installation tool any of the one or more anchors that are not aligned with a reactor tube when the movable ram is aligned with the first selected reactor tube.

Clause A12. The method of any preceding clause, further comprising stabilising the installation tool using one or more stabilising feet that are coupled to the installation frame.

Clause A13. The method of clause A12, further comprising levelling the installation tool by adjusting one or more of the stabilising feet.

Clause A14. The method of clause A12 or clause A13, wherein the one or more stabilising feet are utilised in place of any of the one or more anchors that are detached from the installation tool.

Clause A15. The method of any preceding clause, wherein in step ii) each of the one or more anchors are expanded to grip an inner surface of the reactor tube.

Clause A16. The method of clause A15, wherein the one or more anchors are expanded using a manual, hydraulic, pneumatic or electrical motive force.

Clause A17. The method of clause A15, wherein the one or more anchors are sprung-loaded and biased to expand to grip the inner surface of the reactor tube.

Clause A18. The method of any preceding clause, wherein the movable ram comprises an aligning device which aligns the one or more catalyst carriers with the first selected reactor tube.

Clause A19. The method of clause A18, wherein the aligning device comprises a first engaging part that engages a second engaging part of the one or more catalyst carriers; and optionally wherein the first engaging part is resilient and/or sprung-loaded.

Clause A20. The method of any preceding clause, wherein the movable ram is configured for pushing one or more catalyst carriers into a second selected reactor tube and optionally one or more further selected reactor tubes simultaneously to pushing the one or more catalyst carriers into the first selected reactor tube; and actuating the movable ram simultaneously pushes one or more catalyst carriers into the first selected reactor tube and one or more catalyst carriers into the second selected reactor tube and optionally one or more catalyst carriers into the one or more further selected reactor tubes.

Clause A21. The method of any preceding clause, further comprising the steps of:
  iv) disengaging the one or more anchors from the one or more reactor tubes located alongside the first selected reactor tube;
  v) moving the installation tool and re-attaching the installation tool to the tubular reactor by engaging the one or more anchors in one or more reactor tubes located alongside a second selected reactor tube so as to align the movable ram with the second selected reactor tube; and
  vi) actuating the movable ram to push one or more catalyst carriers into the second selected reactor tube.

Clause A22. An installation tool for installing catalyst carriers into a selected reactor tube of a tubular reactor, the installation tool comprising:
  a) an installation frame;
  b) a movable ram mounted to the installation frame and configured for pushing one or more catalyst carriers into the selected reactor tube; and
  c) one or more anchors for engaging in one or more reactor tubes located alongside the selected reactor tube so as to releasably attach the installation frame to the tubular reactor.

Clause A23. The installation tool of clause A22, wherein the movable ram is a manual, hydraulic, pneumatic, or electro-mechanical ram.

Clause A24. The installation tool of clause A22 or clause A23, wherein the installation frame defines a loading station for receiving the one or more catalyst carriers.

Clause A25. The installation tool of clause A24, wherein the loading station is configured to hold an insertion set of one, two, three, or more catalyst carriers, and the movable ram is configured for pushing the insertion set of catalyst carriers into the first selected reactor tube in a single stroke.

Clause A26. The installation tool of any one of clauses A22 to A25, wherein the one or more anchors are detachable from the installation tool.

Clause A27. The installation tool of any one of clauses A22 to A26, wherein the one or more anchors are expandable for gripping an inner surface of the reactor tube.

Clause A28. The installation tool of any one of clauses A22 to A27, wherein the one or more anchors comprise manually, hydraulically, pneumatically or electrically expandable anchors.

Clause A29. The installation tool of any one of clauses A22 to A27, wherein the one or more anchors comprise sprung-loaded anchors, optionally sprung-loaded camming devices.

Clause A30. The installation tool of any one of clauses A22 to A29, further comprising one or more stabilising feet that are coupled to the installation frame.

Clause A31. The installation tool of any one of clauses A22 to A30, wherein the movable ram comprises an aligning device for aligning the one or more catalyst carriers with the first selected reactor tube.

Clause A32. The installation tool of clause A31, wherein the aligning device comprises a first engaging part for engaging a second engaging part of the one or more catalyst carriers; and optionally wherein the first engaging part is resilient and/or sprung-loaded.

Clause A33. The installation tool of any one of clauses A22 to A32, wherein the movable ram comprises a first ram portion for pushing the one or more catalyst carriers into the first selected reactor tube and a second ram portion for simultaneously pushing one or more catalyst carriers into a second selected reactor tube; and optionally one or more further ram portions for simultaneously pushing one or more catalyst carriers into one or more further selected reactor tubes.

Clause A34. The installation tool of any one of clauses A22 to A33, wherein the installation frame comprises a plurality of anchor mounts for coupling the anchors to the installation frame; wherein the plurality of anchor mounts surround an opening that accommodates passage of the one or more catalyst carriers into the selected reactor tube.

Clause A35. The installation tool of clause A34, wherein the installation frame comprises three anchor mounts arranged in a triangular arrangement around the opening, or four anchor mounts arranged in a quadrilateral arrangement around the opening.

Clause A36. An installation system for installing catalyst carriers into a reactor tube of a tubular reactor, the installation system comprising:
  an installation tool of any one of clauses A22 to A35 that is configured for installation in a head space or a footer space of the tubular reactor;
  a source of motive power locatable outside the tubular reactor and configured to move the movable ram of the installation tool; and
  one or more hoses for supplying power from the source of motive power to the installation tool.

Clause A37. The installation system of clause A36, further comprising:
  a second installation tool of any one of clauses A22 to A35 that is configured for installation in the head space or the footer space of the same tubular reactor; and
  one or more hoses for supplying power from the source of motive power to the second installation tool.

Clause A38. The installation system of clause A36 or clause A37, wherein the source of motive power comprises a manual, hydraulic, pneumatic, or electrical source.

Clause B1. A method of installing catalyst carriers into a reactor tube of a tubular reactor, the tubular reactor being of a type comprising a plurality of reactor tubes that extend between a first tube sheet and a second tube sheet, with a heat-exchange zone being provided between the first tube sheet and the second tube sheet;

the method comprising:
i) providing a plurality of catalyst carriers that contain a catalyst;
ii) providing a support unit; and
iii) installing the support unit and the plurality of catalyst carriers into the reactor tube such that the support unit is aligned with the second tube sheet and the plurality of catalyst carriers are arranged in a stacked arrangement abutting the support unit such that all of the catalyst within the reactor tube is located within the heat-exchange zone.

Clause B2. The method of clause B1, wherein the first tube sheet is an upper tube sheet and the second tube sheet is a lower tube sheet and the support unit is installed so as to be located at the level of the lower tube sheet and the plurality of catalyst carriers are arranged in the stacked arrangement on top of the support unit such that all of the catalyst within the reactor tube is located above the level of the lower tube sheet within the heat-exchange zone.

Clause B3. The method of clause B2, wherein after insertion the support unit is located at the bottom of the stacked arrangement, optionally engaged against a support surface of the tubular reactor.

Clause B4. The method of clause B1, wherein the first tube sheet is a first end tube sheet and the second tube sheet is a second end tube sheet and the support unit is installed so as to be aligned with the second end tube sheet and the plurality of catalyst carriers are arranged in the stacked arrangement to one side of the support unit such that all of the catalyst within the reactor tube is located to one side of the second end tube sheet within the heat-exchange zone.

Clause B5. The method of any one of clauses B1 to B4, wherein the support unit is pushed first into the reactor tube followed by the plurality of catalyst carriers.

Clause B6. The method of any one of clauses B1 to B5, wherein the support unit is attached to one or more catalyst carriers to form an insertion set; and optionally the insertion set is pushed into the reactor tube in a single operation with the support unit foremost.

Clause B7. The method of clause 6, wherein the support unit is attached to the one or more catalyst carriers to form the insertion set using co-operating formations.

Clause B8. The method of any one of clauses B1 to B7, further comprising providing a spacer element for aligning the support unit with an inner surface of the reactor tube.

Clause B9. The method of any one of clauses B1 to B8, further comprising forming a seal between the support unit and an inner surface of the reactor tube such that liquids and gases passing along the reactor tube are preferentially directed to flow through an interior of the support unit.

Clause B10. The method of any one of clauses B1 to B9, further comprising selecting the materials and any contents of the support unit to be non-reactive with respect to the intended process conditions of the tubular reactor.

Clause B11. A support unit for installation into a reactor tube of a tubular reactor, the tubular reactor being of a type comprising a plurality of reactor tubes that extend between a first tube sheet and a second tube sheet, with a heat-exchange zone being provided between the first tube sheet and the second tube sheet; the support unit comprising an elongate body having a first end configured to engage against a support surface of the tubular reactor when the support unit is installed in the reactor tube and a second end configured to engage against an end of a stack of catalyst carriers abutting the support unit;

wherein the length of the elongate body is configured to support the stack of catalyst carriers such that all of the catalyst within the reactor tube is located within the heat-exchange zone.

Clause B12. The support unit of clause B11, which is attachable to one or more catalyst carriers to form an insertion set.

Clause B13. The support unit of clause B12, further comprising one or more co-operating formations for engaging one or more co-operating formations of the one or more catalyst carriers.

Clause B14. The support unit of any one of clauses B11 to B13, further comprising a spacer element for aligning the support unit with an inner surface of the reactor tube.

Clause B15. The support unit of any one of clauses B11 to B14, further comprising a seal for sealing between the support unit and an inner surface of the reactor tube; and optionally wherein the seal is or comprises a spacer element for aligning the support unit with an inner surface of the reactor tube.

Clause B16. The support unit of any one of clauses B11 to B15, wherein the materials and any contents of the support unit are non-reactive with respect to the intended process conditions of the tubular reactor.

Clause C1. A method of installing catalyst carriers into a reactor tube of a tubular reactor, the tubular reactor being of a type comprising a plurality of reactor tubes that extend between a first tube sheet and a second tube sheet, with a heat-exchange zone being provided between the first tube sheet and the second tube sheet;

the method comprising:
i) providing a plurality of catalyst carriers that contain a catalyst;
ii) providing a spacer unit;
iii) installing the plurality of catalyst carriers into the reactor tube followed by the spacer unit such that the spacer unit is aligned with the first tube sheet and the plurality of catalyst carriers are arranged in a stacked arrangement abutting the spacer unit such that all of the catalyst within the reactor tube is located within the heat-exchange zone.

Clause C2. The method of clause C1, wherein the first tube sheet is an upper tube sheet and the second tube sheet is a lower tube sheet and the spacer unit is installed so as to be located at the level of the upper tube sheet and the plurality of catalyst carriers are arranged in the stacked arrangement beneath the spacer unit such that all of the catalyst within the reactor tube is located beneath the level of the upper tube sheet within the heat-exchange zone.

Clause C3. The method of clause C2, wherein installing the spacer unit comprises pushing the spacer unit into the reactor tube to downwardly displace the plurality of catalyst carriers within the reactor tube such that the catalyst in an uppermost catalyst carrier is located beneath the level of the upper tube sheet.

Clause C4. The method of clause C1, wherein the first tube sheet is a first end tube sheet and the second tube sheet is a second end tube sheet and the spacer unit is installed so as to be aligned with the first end tube sheet and the plurality of catalyst carriers are arranged in the stacked arrangement to one side of the spacer unit such that all of the catalyst within the reactor tube is located to one side of the first end tube sheet within the heat-exchange zone.

Clause C5. The method of any one of clauses C1 to C4, further comprising removing the spacer unit from the reactor tube to leave an endmost catalyst carrier of the stacked arrangement positioned at a point such that the catalyst in the endmost catalyst carrier is located within the heat-exchange zone.

Clause C6. The method of clause C5, further comprising inserting a secondary spacer unit against the endmost catalyst carrier; and optionally wherein the secondary spacer unit spans between the endmost catalyst carrier and a support surface of the tubular reactor;

and optionally wherein the support surface is a support grid that extends across an open end of the reactor tube.

Clause C7. The method of any one of clauses C1 to C6, wherein the spacer unit is attached to one or more of the catalyst carriers to form an insertion set; and the insertion set is pushed into the reactor tube in a single operation with the spacer unit aftmost.

Clause C8. The method of clause C7, wherein the spacer unit is attached to the one or more catalyst carriers to form the insertion set using co-operating formations provided on the support unit and on the one or more catalyst carriers.

Clause C9. The method of any one of clauses C1 to C8, wherein a position of an endmost catalyst carrier of the stacked arrangement in the reactor tube is controlled by fixing a length of the spacer unit between a first end face of the spacer unit and an abutment face of the spacer unit, and inserting the spacer unit into the reactor tube until the abutment face is engaged against a datum face of the reactor tube, optionally against an end face of the reactor tube.

Clause C10. The method of any one of clauses C1 to C9, wherein the plurality of catalyst carriers and the spacer unit are configured to be installed into the reactor tube using one and the same installation tool.

Clause C11. The method of clause C10, wherein the installation tool uses a movable ram to push the plurality of catalyst carriers and the spacer unit into the reactor tube.

Clause C12. A spacer unit for installation into a reactor tube of a tubular reactor, the tubular reactor being of a type comprising a plurality of reactor tubes that extend between a first tube sheet and a second tube sheet, with a heat-exchange zone being provided between the first tube sheet and the second tube sheet;
  the spacer unit comprising an elongate body having a first end configured to engage against an end of a stack of catalyst carriers and a second end configured to engage against an installation tool;
  wherein the length of the elongate body is configured to enable displacement of the stack of catalyst carriers sufficiently into the reactor tube such that all of the catalyst within the reactor tube is located within the heat-exchange zone.

Clause C13. The spacer unit of clause C12, which is releasably attachable to one or more catalyst carriers to form an insertion set.

Clause C14. The spacer unit of clause C13, further comprising one or more co-operating formations provided on the spacer unit for engaging one or more co-operating formations on the one or more catalyst carriers.

Clause C15. The spacer unit of any one of clauses C12 to C14, wherein the materials and any contents of the spacer unit are non-reactive with respect to the intended process conditions of the tubular reactor.

Clause C16. The spacer unit of any one of clauses C12 to C15, wherein the elongate body comprises an abutment face for engaging against a datum face of the reactor tube, optionally against an end face of the reactor tube.

Clause C17. The spacer unit of clause C16, wherein the abutment face comprises an outwardly extending flange having an outer diameter configured to be greater than an internal diameter of the reactor tube.

Clause C18. The spacer unit of any one of clauses C12 to C17, wherein the second end of the elongate body comprises a socket for engaging with a movable ram of an installation tool.

Clause C19. The spacer unit of any one of clauses C12 to C18, wherein the first end of the elongate body comprises a skirt for engaging with an end of a catalyst carrier; optionally an annular skirt for engaging with an annular rim or annular recess provided at an end of the catalyst carrier.

Clause D1. A method of at least partially emptying a reactor tube of a tubular reactor which is initially at least partially filled with catalyst carriers, the catalyst carriers each being of a type containing a catalyst and having a seal that engages against an inner surface of the reactor tube;
  the method comprising:
  i) providing a plurality of ejector units;
  ii) installing a first ejection set of one or more of the ejector units into a first end of the reactor tube to contact and displace an endmost catalyst carrier within the reactor tube to thereby push the catalyst carriers within the reactor tube towards a second end of the reactor tube;
  iii) installing a subsequent ejection set of one or more of the ejector units into the first end of the reactor tube to contact and displace an ejection set of the one or more ejector units already within the reactor tube to thereby push the catalyst carriers further towards the second end of the reactor tube;
  iv) repeating step iii) one or more times until three or more of the catalyst carriers are displaced to the second end of the reactor tube and discharged out of the second end of the reactor tube.

Clause D2. The method of clause D1, wherein the first end is a top end of the reactor tube and the second end is a bottom end of the reactor tube.

Clause D3. The method of clause D1 or clause D2, wherein the ejector units are configured to have a maximum diameter that is less than an inner diameter of the reactor tube so as to be freely slidable therein.

Clause D4. The method of any one of clauses D1 to D3, further comprising the step of:
  v) after discharging the catalyst carriers out of the second end of the reactor tube, allowing the plurality of ejector units to slide out of the second end of the reactor tube under the action of gravity.

Clause D5. The method of any one of clauses D1 to D4, wherein the first ejection set and/or the subsequent ejection set comprises two or more ejector units that are attached to each other.

Clause D6. The method of any one of clauses D1 to D5, wherein the first ejection set and the subsequent ejection set are each pushed into the reactor tube with a single stroke of an installation tool.

Clause D7. The method of any one of clauses D1 to D6, wherein the catalyst carriers and the plurality of ejector units are configured to be inserted into the reactor tube using one and the same installation tool.

Clause D8. The method of clause D7, wherein the installation tool uses a movable ram to push the catalyst carriers and the plurality of ejector units into the reactor tube.

Clause D9. An ejector unit for removing catalyst carriers from a reactor tube of a tubular reactor, the ejector unit comprising an elongate body having a first end configured for engaging against a catalyst carrier and a second end configured for engaging against an installation tool;

wherein a maximum diameter of the elongate body is configured to be less than an inner diameter of the reactor tube so that the ejector unit can slide freely within the reactor tube.

Clause D10. The ejector unit of clause D9, wherein the first end of the ejector unit is also configured for engaging against an end of another ejector unit.

Clause D11. The ejector unit of clause D9 or clause D10, which is attachable to one or more other ejector units to form an ejection set.

Clause D12. The ejector unit of clause D11, further comprising one or more co-operating formations provided on or towards the first end of the ejector unit for engaging one or more co-operating formations on or towards the second end of another ejector unit.

Clause D13. The ejector unit of any one of clauses D9 to D12, wherein the second end of the elongate body comprises a socket for engaging with a movable ram of an installation tool.

Clause D14. The ejector unit of any one of clauses D9 to D13, wherein the first end of the elongate body comprises a skirt for engaging with an end of a catalyst carrier and/or an end of another ejection unit.

Clause E1. A method of installing catalyst carriers into a reactor tube of a tubular reactor, the method comprising the steps of:
  i) providing a plurality of catalyst carriers;
  ii) engaging two or more of the plurality of catalyst carriers together to form an insertion set;
  iii) loading the insertion set in an installation tool; and
  iv) using the installation tool to push the insertion set into the reactor tube.

Clause E2. The method of clause E1, wherein the insertion set comprises at least two, optionally at least three, optionally more than three, catalyst carriers.

Clause E3. The method of clause E1 or clause E2, wherein the insertion set comprises a stacked arrangement of catalyst carriers with adjacent catalyst carriers being releasably engaged together using co-operating formations provided on or towards an upper end and on or towards a lower end of each catalyst carrier.

Clause E4. The method of clause E3, wherein the adjacent catalyst carriers are rotationally locked together.

Clause E5. The method of any one of clauses E1 to E4, wherein the insertion set comprises a first insertion set and a second insertion set is formed by releasably engaging a further two or more of the plurality of catalyst carriers; wherein the installation tool is used to push the second insertion set into the reactor tube after the first insertion set to thereby push the first insertion set further down the reactor tube.

Clause E6. A plurality of catalyst carriers for insertion into a reactor tube of a tubular reactor, each of the plurality of catalyst carriers comprising a container for holding catalyst in use which extends between an upper end and a lower end of the catalyst carrier;
  each catalyst carrier comprising one or more upper co-operating formations provided on or towards the upper end of the container and one or more lower co-operating formations provided on or towards the lower end of the container;
  the one or more upper co-operating formations being configured for engagement with the one or more lower co-operating formations;
  wherein two or more of the plurality of the catalyst carriers can be attached together in a stacked arrangement with adjacent catalyst carriers being engaged together by engagement of the one or more lower co-operating formations and the one or more upper co-operating formations.

Clause E7. The plurality of catalyst carriers of clause E6, wherein the one or more upper co-operating formations and the one or more lower co-operating formations are configured to be engaged and disengaged by relative rotational movement of the adjacent catalyst carriers.

Clause E8. The plurality of catalyst carriers of clause E7, wherein the one or more upper co-operating formations and the one or more lower co-operating formations form one or more bayonet fittings.

Clause E9. The plurality of catalyst carriers of any one of clauses E6 to E8, wherein each container comprises a bottom surface at the lower end, a top surface at the upper end, and a carrier outer wall extending between the bottom surface to the top surface.

Clause E10. The plurality of catalyst carriers of clause E9, wherein each container further comprises a seal extending beyond the carrier outer wall; and optionally the carrier outer wall comprises apertures located below the seal.

Clause E11. The plurality of catalyst carriers of clause E10, wherein the one or more upper co-operating formations are provided above the seal.

Clause E12. The plurality of catalyst carriers of any one of clauses E9 to E11, wherein each container further comprises an annular chamber for holding catalyst in use, said annular chamber having a perforated inner chamber wall defining an inner channel, a perforated outer chamber wall, a top surface closing the annular chamber and a bottom surface closing the annular chamber.

Clause E13. A catalyst carrier being one of the plurality of catalyst carriers of any one of clauses E6 to E12.

The invention claimed is:

1. A method of installing catalyst carriers into a first selected reactor tube of a tubular reactor, the method comprising the steps of:
  i) providing an installation tool, the installation tool comprising:
    a) an installation frame;
    b) a movable ram mounted to the installation frame and configured for pushing one or more catalyst carriers into the first selected reactor tube; and
    c) one or more anchors for releasably attaching the installation frame to the tubular reactor;
  ii) attaching the installation tool to the tubular reactor by engaging the one or more anchors in one or more reactor tubes located alongside the first selected reactor tube so as to align the movable ram with the first selected reactor tube; and
  iii) actuating the movable ram to push the one or more catalyst carriers into the first selected reactor tube.

2. The method of claim 1, wherein in step ii) the installation tool is attached such that the installation frame is located in a head space or footer space of the tubular reactor outside of the reactor tubes; and optionally the installation frame is located above an upper tube sheet of the tubular reactor or below a lower tube sheet of the tubular reactor.

3. The method of claim 1, wherein step i) further comprises inserting the installation tool into a head space or footer space of the tubular reactor through an access opening of the tubular reactor.

4. The method of claim 1, wherein the movable ram is a powered ram or a manually driven ram;

and optionally wherein the movable ram is switchable from a powered mode in which the movable ram moves under power and a manual mode in which the movable ram is manually driven.

5. The method of claim 1,
wherein the installation tool is coupled to a source of motive power for moving the movable ram which is located outside the tubular reactor; and optionally wherein the source of motive power comprises a hydraulic, pneumatic, or electrical source; or
wherein the installation tool comprises a source of motive power which is located inside the tubular reactor for moving the movable ram; and optionally wherein the source of motive power comprises a hydraulic, pneumatic, or electrical source.

6. The method of claim 1, wherein in step iii) an insertion set of one, two, three, or more catalyst carriers are pushed into the first selected reactor tube by a single stroke of the movable ram;
and optionally wherein step iii) is repeated one or more times to push one or more additional insertion sets into the first selected reactor tube.

7. The method of claim 6, wherein pushing an insertion set into a first end of the first selected reactor tube causes one or more catalyst carriers to be pushed out of a second end of the first selected reactor tube.

8. The method of claim 1, further comprising stabilising the installation tool using one or more stabilising feet that are coupled to the installation frame;
and optionally further comprising levelling the installation tool by adjusting one or more of the stabilising feet; and/or
wherein the one or more stabilising feet are utilised in place of any of the one or more anchors that are detached from the installation tool.

9. The method of claim 1, wherein in step ii) each of the one or more anchors are expanded to grip an inner surface of the reactor tube;
and optionally:
wherein the one or more anchors are expanded using a manual, hydraulic, pneumatic or electrical motive force; or
wherein the one or more anchors are sprung-loaded and biased to expand to grip the inner surface of the reactor tube.

10. The method of claim 1, wherein the movable ram comprises an aligning device which aligns the one or more catalyst carriers with the first selected reactor tube;
and optionally wherein the aligning device comprises a first engaging part that engages a second engaging part of the one or more catalyst carriers; and optionally wherein the first engaging part is resilient and/or sprung-loaded.

11. The method of claim 1, wherein the movable ram is configured for pushing one or more catalyst carriers into a second selected reactor tube and optionally one or more further selected reactor tubes simultaneously to pushing the one or more catalyst carriers into the first selected reactor tube; and actuating the movable ram simultaneously pushes one or more catalyst carriers into the first selected reactor tube and one or more catalyst carriers into the second selected reactor tube and optionally one or more catalyst carriers into the one or more further selected reactor tubes.

12. The method of claim 1, further comprising the steps of:
iv) disengaging the one or more anchors from the one or more reactor tubes located alongside the first selected reactor tube;
v) moving the installation tool and re-attaching the installation tool to the tubular reactor by engaging the one or more anchors in one or more reactor tubes located alongside a second selected reactor tube so as to align the movable ram with the second selected reactor tube; and
vi) actuating the movable ram to push one or more catalyst carriers into the second selected reactor tube.

13. An installation tool for installing catalyst carriers into a selected reactor tube of a tubular reactor, the installation tool comprising:
a) an installation frame;
b) a movable ram mounted to the installation frame and configured for pushing one or more catalyst carriers into the selected reactor tube; and
c) one or more anchors for engaging in one or more reactor tubes located alongside the selected reactor tube so as to releasably attach the installation frame to the tubular reactor.

14. The installation tool of claim 13, wherein the movable ram is a manual, hydraulic, pneumatic, or electro-mechanical ram.

15. The installation tool of claim 13, wherein the installation frame defines a loading station for receiving the one or more catalyst carriers;
and optionally wherein the loading station is configured to hold an insertion set of one, two, three, or more catalyst carriers, and the movable ram is configured for pushing the insertion set of catalyst carriers into the first selected reactor tube in a single stroke.

16. The installation tool of claim 13, wherein the one or more anchors are expandable for gripping an inner surface of the reactor tube.

17. The installation tool of claim 13, wherein:
the one or more anchors comprise manually, hydraulically, pneumatically or electrically expandable anchors; or
wherein the one or more anchors comprise sprung-loaded anchors, optionally sprung-loaded camming devices.

18. The installation tool of claim 13, further comprising one or more stabilising feet that are coupled to the installation frame.

19. The installation tool of claim 13, wherein the movable ram comprises an aligning device for aligning the one or more catalyst carriers with the first selected reactor tube;
and optionally wherein the aligning device comprises a first engaging part for engaging a second engaging part of the one or more catalyst carriers; and optionally wherein the first engaging part is resilient and/or sprung-loaded.

20. The installation tool of claim 13, wherein the movable ram comprises a first ram portion for pushing the one or more catalyst carriers into the first selected reactor tube and a second ram portion for simultaneously pushing one or more catalyst carriers into a second selected reactor tube; and optionally one or more further ram portions for simultaneously pushing one or more catalyst carriers into one or more further selected reactor tubes.

21. The installation tool of claim 13, wherein the installation frame comprises a plurality of anchor mounts for coupling the anchors to the installation frame; wherein the plurality of anchor mounts surround an opening that accommodates passage of the one or more catalyst carriers into the selected reactor tube;

and optionally wherein the installation frame comprises three anchor mounts arranged in a triangular arrangement around the opening, or four anchor mounts arranged in a quadrilateral arrangement around the opening.

22. An installation system for installing catalyst carriers into a reactor tube of a tubular reactor, the installation system comprising:
- an installation tool as claimed in claim 13 that is configured for installation in a head space or a footer space of the tubular reactor;
- a source of motive power locatable outside the tubular reactor and configured to move the movable ram of the installation tool; and
- one or more hoses for supplying power from the source of motive power to the installation tool.

23. The installation system of claim 22, further comprising:
- a second installation tool configured for installation in the head space or the footer space of the same tubular reactor; and
- one or more hoses for supplying power from the source of motive power to the second installation tool.

24. The installation system of claim 22, wherein the source of motive power comprises a manual, hydraulic, pneumatic, or electrical source.

\* \* \* \* \*